United States Patent
Dadashikelayeh

(10) Patent No.: US 10,713,582 B2
(45) Date of Patent: Jul. 14, 2020

(54) METHODS AND SYSTEMS FOR QUANTUM COMPUTING

(71) Applicant: 1QB Information Technologies Inc., Vancouver (CA)

(72) Inventor: Majid Dadashikelayeh, Vancouver (CA)

(73) Assignee: 1QB INFORMATION TECHNOLOGIES INC., Vancouver (CA)

( * ) Notice: Subject to any disclaimer, the term of this patent is extended or adjusted under 35 U.S.C. 154(b) by 0 days.

(21) Appl. No.: 16/124,083

(22) Filed: Sep. 6, 2018

(65) Prior Publication Data

US 2019/0019103 A1    Jan. 17, 2019

Related U.S. Application Data

(63) Continuation of application No. PCT/CA2017/050320, filed on Mar. 10, 2017.
(Continued)

(51) Int. Cl.
*G06N 5/02* (2006.01)
*G06F 17/11* (2006.01)
(Continued)

(52) U.S. Cl.
CPC .............. *G06N 10/00* (2019.01); *G06F 8/30* (2013.01); *G06F 9/44* (2013.01); *G06F 9/50* (2013.01);
(Continued)

(58) Field of Classification Search
CPC .......... G06N 10/00; G06N 5/003; G06N 5/02; G06F 9/02; G06F 9/32; G06F 17/11; G06F 8/30; G06F 17/18
See application file for complete search history.

(56) References Cited

U.S. PATENT DOCUMENTS

| | | |
|---|---|---|
| 7,113,967 B2 | 9/2006 | Cleve et al. |
| 7,135,701 B2 | 11/2006 | Amin et al. |

(Continued)

FOREIGN PATENT DOCUMENTS

| | | |
|---|---|---|
| CA | 2840958 A1 | 1/2013 |
| CA | 2881033 A1 | 4/2015 |

(Continued)

OTHER PUBLICATIONS

Roman Bartak et al., Constraint Satisfaction Techniques for Planning and Scheduling Problems (Coplas-15), Jul. 6, 2015, [Retrieved on Nov. 17, 2019]. Retrieved from the internet: <URL: https://www.cs.bgu.ac.il/~icaps15/workshops/Proceedings%20COPLAS%202015.pdf> 41 Pages (1-41) (Year: 2015).*

(Continued)

*Primary Examiner* — Anibal Rivera
(74) *Attorney, Agent, or Firm* — Wilson Sonsini Goodrich & Rosati

(57) ABSTRACT

Described herein are methods, systems, and media for generating a quantum-ready or quantum-enabled software development kit (SDK) for a quantum computing system. Such methods may comprise accepting user input from an application at an application interface, which application is executed on a digital computer, and implementing one or more algorithms, at an algorithms layer, that may be solved heuristically or exactly depending on the requirements of the user input. The one or more algorithms may abstract away a complexity of the application; transforming the one or more algorithms from the application space into the one or more instructions in polynomial unconstrained binary optimization (PUBO) form. The one or more instruction may be executed in PUBO form at the common interface solver layer.

22 Claims, 7 Drawing Sheets

Related U.S. Application Data

(60) Provisional application No. 62/307,296, filed on Mar. 11, 2016.

(51) Int. Cl.
*G06N 99/00* (2019.01)
*G06N 10/00* (2019.01)
*G06N 5/00* (2006.01)
*G06F 9/44* (2018.01)
*G06F 8/30* (2018.01)
*G06F 9/50* (2006.01)
*G06F 9/32* (2018.01)

(52) U.S. Cl.
CPC ............... *G06N 5/003* (2013.01); *G06N 5/02* (2013.01); *G06F 9/32* (2013.01)

(56) References Cited

U.S. PATENT DOCUMENTS

| | | |
|---|---|---|
| 7,234,144 B2 | 6/2007 | Wilt et al. |
| 7,418,283 B2 | 8/2008 | Amin et al. |
| 7,533,068 B2 | 5/2009 | Maassen Van Den Brink et al. |
| 7,619,437 B2 | 11/2009 | Thom et al. |
| 7,639,035 B2 | 12/2009 | Berkley |
| 7,660,533 B1 | 2/2010 | Meyers et al. |
| 7,898,282 B2 | 3/2011 | Harris et al. |
| 7,984,012 B2 | 7/2011 | Coury et al. |
| 8,008,942 B2 | 8/2011 | Van Den Brink et al. |
| 8,126,649 B2 | 2/2012 | Frasch et al. |
| 8,195,596 B2 | 6/2012 | Rose et al. |
| 8,195,726 B2 | 6/2012 | Macready et al. |
| 8,219,605 B2 | 7/2012 | Cowlishaw et al. |
| 8,230,432 B2 | 7/2012 | Bryant et al. |
| 8,244,662 B2 | 8/2012 | Coury et al. |
| 8,283,943 B2 | 10/2012 | Van Den Brink et al. |
| 8,421,053 B2 | 4/2013 | Bunyk et al. |
| 8,503,885 B2 | 8/2013 | Meyers et al. |
| 8,655,828 B2 | 2/2014 | Rose |
| 8,832,165 B2 * | 9/2014 | Allen ............ G06N 10/00 708/200 |
| 9,537,953 B1 | 1/2017 | Dadashikelayeh et al. |
| 9,660,859 B1 | 5/2017 | Dadashikelayeh et al. |
| 9,727,824 B2 | 8/2017 | Rose et al. |
| 9,870,273 B2 | 1/2018 | Dadashikelayeh et al. |
| 9,881,256 B2 | 1/2018 | Hamze et al. |
| 10,044,638 B2 | 8/2018 | Dadashikelayeh et al. |
| 2003/0005068 A1 | 1/2003 | Nickel et al. |
| 2003/0121028 A1 | 6/2003 | Coury et al. |
| 2004/0267916 A1 | 12/2004 | Chambliss et al. |
| 2005/0273306 A1 | 12/2005 | Hilton et al. |
| 2006/0221978 A1 | 10/2006 | Venkatachalam |
| 2006/0225165 A1 | 10/2006 | Maassen Van Den Brink et al. |
| 2007/0180586 A1 | 8/2007 | Amin |
| 2007/0239366 A1 | 10/2007 | Hilton et al. |
| 2008/0186918 A1 | 8/2008 | Tinnakornsrisuphap et al. |
| 2008/0215850 A1 | 9/2008 | Berkley et al. |
| 2008/0218519 A1 | 9/2008 | Coury et al. |
| 2008/0262990 A1 | 10/2008 | Kapoor et al. |
| 2008/0313430 A1 | 12/2008 | Bunyk |
| 2009/0070402 A1 * | 3/2009 | Rose ............ G06N 10/00 709/201 |
| 2009/0078932 A1 | 3/2009 | Amin |
| 2009/0164435 A1 | 6/2009 | Routt |
| 2009/0325694 A1 | 12/2009 | Beckman et al. |
| 2010/0261481 A1 | 10/2010 | Resende et al. |
| 2010/0306142 A1 | 12/2010 | Amin |
| 2011/0231462 A1 | 9/2011 | Macready et al. |
| 2011/0238378 A1 * | 9/2011 | Allen ............ G06N 10/00 702/186 |
| 2011/0238855 A1 | 9/2011 | Korsunsky et al. |
| 2011/0296229 A1 | 12/2011 | Cowlishaw et al. |
| 2012/0072579 A1 | 3/2012 | Teather |
| 2012/0215821 A1 | 8/2012 | Macready et al. |
| 2012/0240185 A1 | 9/2012 | Kapoor et al. |
| 2012/0253926 A1 | 10/2012 | Chen et al. |
| 2012/0254586 A1 | 10/2012 | Amin et al. |
| 2012/0278374 A1 | 11/2012 | Cowlishaw et al. |
| 2012/0326720 A1 | 12/2012 | Gambetta et al. |
| 2013/0026183 A1 | 1/2013 | Foster |
| 2013/0144925 A1 | 6/2013 | Macready et al. |
| 2013/0263131 A1 | 10/2013 | Beda, III et al. |
| 2013/0308956 A1 | 11/2013 | Meyers et al. |
| 2013/0336472 A1 | 12/2013 | Fahlgren et al. |
| 2014/0025606 A1 | 1/2014 | Macready |
| 2014/0122702 A1 | 5/2014 | Jung et al. |
| 2014/0123325 A1 | 5/2014 | Jung et al. |
| 2014/0187427 A1 * | 7/2014 | Macready ............ G06N 7/005 505/170 |
| 2014/0214257 A1 | 7/2014 | Williams et al. |
| 2014/0250288 A1 * | 9/2014 | Roy ............ B82Y 10/00 712/223 |
| 2014/0258730 A1 | 9/2014 | Stecher |
| 2014/0324933 A1 * | 10/2014 | Macready ............ G06N 5/003 708/200 |
| 2014/0337612 A1 | 11/2014 | Williams et al. |
| 2014/0344322 A1 * | 11/2014 | Ranjbar ............ G06F 17/11 708/270 |
| 2014/0379924 A1 | 12/2014 | Das et al. |
| 2015/0006443 A1 | 1/2015 | Rose et al. |
| 2015/0032991 A1 * | 1/2015 | Lanting ............ G06N 10/00 712/30 |
| 2015/0032993 A1 * | 1/2015 | Amin ............ G06N 10/00 712/42 |
| 2015/0055961 A1 | 2/2015 | Meyers et al. |
| 2015/0111754 A1 | 4/2015 | Harris et al. |
| 2015/0120551 A1 | 4/2015 | Jung et al. |
| 2015/0120555 A1 | 4/2015 | Jung et al. |
| 2015/0169746 A1 | 6/2015 | Hatami-Hanza |
| 2015/0178349 A1 | 6/2015 | Niewodniczanski et al. |
| 2015/0193692 A1 * | 7/2015 | Israel ............ G06N 10/00 706/52 |
| 2015/0205759 A1 * | 7/2015 | Israel ............ G06N 10/00 703/2 |
| 2015/0220852 A1 | 8/2015 | Hatami-Hanza |
| 2015/0227559 A1 | 8/2015 | Hatami-Hanza |
| 2015/0262074 A1 * | 9/2015 | Bruestle ............ G06N 10/00 712/214 |
| 2015/0269124 A1 * | 9/2015 | Hamze ............ G06F 17/18 703/2 |
| 2015/0332994 A1 * | 11/2015 | Mallik ............ H01L 25/0652 257/774 |
| 2015/0349960 A1 | 12/2015 | Bagley |
| 2015/0358251 A1 | 12/2015 | Varga et al. |
| 2015/0363358 A1 | 12/2015 | Ronagh et al. |
| 2015/0363708 A1 * | 12/2015 | Amin ............ G06N 10/00 712/42 |
| 2016/0026183 A1 | 1/2016 | Williams et al. |
| 2016/0071021 A1 * | 3/2016 | Raymond ............ G06F 15/76 712/28 |
| 2016/0132785 A1 | 5/2016 | Amin et al. |
| 2016/0171368 A1 * | 6/2016 | Aspuru-Guzik ....... G06N 10/00 706/46 |
| 2016/0224515 A1 | 8/2016 | Ronagh et al. |
| 2016/0321559 A1 | 11/2016 | Rose et al. |
| 2016/0328253 A1 | 11/2016 | Majumdar |
| 2016/0328659 A1 * | 11/2016 | Mohseni ............ G06N 10/00 |
| 2016/0338075 A1 * | 11/2016 | McKibben ............ H04W 24/08 |
| 2017/0011305 A1 | 1/2017 | Williams |
| 2017/0017894 A1 * | 1/2017 | Lanting ............ G06N 10/00 |
| 2017/0060642 A1 | 3/2017 | Castellano et al. |
| 2017/0147303 A1 | 5/2017 | Amy et al. |
| 2017/0147695 A1 | 5/2017 | Shih |
| 2017/0223143 A1 | 8/2017 | Johnson et al. |
| 2017/0242824 A1 | 8/2017 | Karimi et al. |
| 2017/0255592 A1 | 9/2017 | Karimi et al. |
| 2017/0255629 A1 * | 9/2017 | Thom ............ G06N 10/00 |
| 2017/0255872 A1 * | 9/2017 | Hamze ............ G06F 9/02 |
| 2017/0286852 A1 | 10/2017 | Rezaie et al. |
| 2017/0286858 A1 | 10/2017 | La Cour et al. |
| 2017/0323195 A1 | 11/2017 | Crawford et al. |
| 2017/0344898 A1 | 11/2017 | Karimi et al. |
| 2017/0351974 A1 | 12/2017 | Rose et al. |

(56) References Cited

U.S. PATENT DOCUMENTS

| | | |
|---|---|---|
| 2017/0372427 A1 | 12/2017 | Johnson et al. |
| 2018/0014970 A1 | 1/2018 | Lembo et al. |
| 2018/0107526 A1 | 4/2018 | Dadashikelayeh et al. |
| 2018/0114138 A1 | 4/2018 | Monroe et al. |
| 2018/0218279 A1 | 8/2018 | Lechner et al. |
| 2018/0218281 A1 | 8/2018 | Reinhardt et al. |
| 2018/0246851 A1 | 8/2018 | Zaaribafiyan et al. |
| 2018/0260730 A1 | 9/2018 | Reagor et al. |
| 2018/0308007 A1 | 10/2018 | Amin et al. |
| 2018/0375790 A1 | 12/2018 | Dadashikelayeh et al. |
| 2019/0087237 A1 | 3/2019 | Dadashikelayeh et al. |

FOREIGN PATENT DOCUMENTS

| | | |
|---|---|---|
| CA | 2902015 A1 | 1/2016 |
| CA | 2921711 A1 | 8/2017 |
| EP | 3113084 A1 | 1/2017 |
| WO | WO-2006026985 A2 | 3/2006 |
| WO | WO-2007089674 A2 | 8/2007 |
| WO | WO-2010148120 A2 | 12/2010 |
| WO | WO-2014210368 A1 | 12/2014 |
| WO | WO-2015060915 A2 | 4/2015 |
| WO | WO-2015121619 A2 | 8/2015 |
| WO | WO-2017111937 A1 | 6/2017 |
| WO | WO-2017145086 A1 | 8/2017 |
| WO | WO-2017149491 A1 | 9/2017 |
| WO | WO-2017152289 A1 | 9/2017 |
| WO | WO-2017201626 A1 | 11/2017 |
| WO | WO-2017214717 A1 | 12/2017 |
| WO | WO-2018119522 A1 | 7/2018 |

OTHER PUBLICATIONS

Ryan Babbush, Towards Viable Quantum Computation for Chemistry, 2015, [Retrieved on Feb. 27, 2020]. Retrieved from the internet: <URL: https://pdfs.semanticscholar.org/aff0/5ecf5f58c2206c923b767d76bed7f43b2a66.pdf?_ga=2.2412147.276222377.1582743768-639821531.1551220934> 376 Pages (1-376) (Year: 2015).*

Fred Glover et al., Polynomial unconstrained binary optimisation—Part 1, 2011, [Retrieved on Feb. 27, 2020]. Retrieved from the internet: <URL: http://leeds-faculty.colorado.edu/glover/fred%20pubs/424%20-%20%20Polynomial> 25 Pages (231-256) (Year: 2011).*

Alidaee et al. Solving the maximum edge weight clique problem via unconstrained quadratic programming. European Journal of Operational Research 181(2):592-597 (2007).

Anthony et al. Quadratization of symmetric pseudo-Boolean functions. Discrete Appl. Math. 203:1-12 (2016).

Assad et al. The quadratic minimum spanning tree problem. Naval Research Logistics 39:399-417(1992).

Babbush et al. Resource Efficient Gadgets for Compiling Adiabatic Quantum Optimization Problems. arXiv:1307.8041v1 [quant-ph] (pp. 1-11) (Jul. 2013) Retrieved from the Internet<https://arxiv.org/pdf/1307.8041.pdf5.

Beasley. Integer programming solution methods. Available at URL: http://people.brunel.ac.uk/-mastjjb/jeb/natcor_ip_rest.pdf (20 pgs.) (2011).

Berry et al. Simulating Hamiltonian dynamics with a truncated Taylor series. Phys Rev Lett 114(9):090502 (2015).

Bian et al. The Ising model: teaching an old problem new tricks. D-Wave Systems 2 (32 pgs.) (2010).

Boros et al. On quadratization of pseudo-Boolean functions. arXiv:1404.6538v1 [math.OC] (11 pgs.) (2014).

Boros et al. Pseudo-boolean optimization. Discrete Applied Mathematics 123(1):155-225 (2002).

Cai et al. A practical heuristic for finding graph minors.arXiv:1406.2741 [quant-ph] (16 pgs) (2014).

Choi. Minor-embedding in adiabatic quantum computation: I. The parameter setting problem. Quantum Information Processing 7(5):193-209 (2008).

Farhi et al. Quantum Adiabatic Evolution Algorithms versus Simulated Annealing.arXiv.org:quant ph/0201031 pp. 1-16 (2002).

Farhi et al. Quantum computation by adiabatic evolution. arXiv preprint quant-ph/0001106 (24 pgs) (2000).

Freund. Applied Lagrange Duality for Constrained Optimization. Massachusetts Institute of Technology (pp. 1-35) (2004).

Geoffrion. Lagrangean relaxation for integer programming. Mathematics Programming Study 2, North-Holland Publishing Company (pp. 1-34) (1974).

Grover. A fast quantum mechanical algorithm for database search. Proceedings of the 28th Annual ACM Symposium on the Theory of Computing (pp. 212-219) (1996).

Ishikawa. Transformation of General Binary MRF Minimization to the First-Order Case. IEEE Transactions on Pattern Analysis and Machine Intelligence. 33(6):1234-1249 (2011).

Karimi et al. A subgradient approach for constrained binary programming via quantum adiabatic evolution. arXiv preprint arXiv:1605.09462 (16 pgs.) (2016).

Karimi et al. Boosting quantum annealer performance via quantum persistence. Online publication eprint arXiv:1606.07797 (Jun. 27/27 and updated Aug. 30, 2016). Accessed May 17, 2017 and available from https://www.arxiv.org/pdf/1606.07797.pdf (25 pgs).

Katzgraber et al. Seeking quantum speedup through spin glasses: the good, the bad, and the ugly. Physical Review 5(3):031026 (2015).

Kellerer et al. Knapsack Problems. Springer (15 pgs.) (2004).

Leyffer. Deterministic Methods for Mixed Integer Nonlinear Programming. University of Dundee (pp. 1-60 and pp. 1-58) (1993).

Li et al. Nonlinear Integer Programming. New York, NY (pp. 1-452) (2006).

Martinis et al. Rabi oscillations in a large Josephson-junction qubit. Physical Review Letters 89:117901 (2002).

McGeoch et al. Experimental Evaluation of an Adiabatic Quantum System for Combinatorial Optimization. Computing Frontiers. Proceeding CF '13 Proceedings of the ACM International Conference on Computing Frontiers. Article No. 23. Available athttp://www.cs.amherst.edu/ccm/cf14-mcgeoch.pdf (11 pgs) (May 14-16, 2013).

Metz. IBM Is Now Letting Anyone Play With Its Quantum Computer. WIRED. (5 pgs.) (May 2016).

Montanaro. Quantum walk speedup of backtracking algorithms. arXiv:1509.02374v2 [quant-ph] (23 pgs) (2015).

O'Gorman et al. Compiling planning into quantum optimization problems: a comparative study. Proc. of the Workshop on Constraint Satisfaction Techniques for Planning and Scheduling Problems (COPLAS-15) (pp. 11-20) (Jun. 2015) Retrieved from the Internet<https://www.cs.bgu.acilt--icaps15/workshops/Proceedings%2000PLAS%202015.pdf>.

PCT/CA2017/050320 International Preliminary Report on Patentability dated Sep. 20, 2018.

PCT/CA2017/050320 International Search Report and Written Opinion dated Jun. 27, 2017.

PCT/CA2017/050637 International Search Report and Written Opinion dated Aug. 25, 2017.

PCT/CA2017/050709 International Search Report and Written Opinion dated Sep. 19, 2017.

PCT/CA2017/051610 International Search Report and Written Opinion dated Mar. 21, 2018.

PCT/IB2017/051038 International Search Report dated May 16, 2017.

PCT/IB2017/051224 International Search Report dated May 18, 2017.

Ronagh et al. Solving constrained quadratic binary problems via quantum adiabatic evolution. arXiv preprint arXiv:1509.05001 (20 pgs.) (2015).

Rosenberg et al. Building an iterative heuristic solver for a quantum annealer. Computational Optimization and Applications 65:845 (2016).

Shapiro et al. A survey of Lagrangean techniques for discrete optimization. Operations Research Center, Massachusetts Institute of Technology, Cambridge, Massachusetts (pp. 1-18 and pp. 1-29) (May 1977).

(56) References Cited

OTHER PUBLICATIONS

Suzuki. Fractal decomposition of exponential operators with applications to many-body theories and Monte Carlo simulations. Physics Letters A 146(6):319-323 (1990).
SymPy Python. Internals of the Polynomial Manupulation Module. Available online at http://docs.sympy.org/latest/modules/polys/internals.html (Accessed Jun. 2016) (136 pgs).
Tavares et al. New algorithms for Quadratic Unconstrained Binary Optimization (QUBO) with applications in engineering and social sciences. Rutgers University Community Repository. Dissertation—Retrieved from the Internet< URL: https://rucorelibrariessutgers.edu/rutgers-lib/25771/> on Feb. 2, 2018 (460 pgs) ( May 2008).
The D-Wave 2X™ Quantum Compute Technology Overview (12 pgs) (2015).
Tran et al. A hybrid quantum-classical approach to solving scheduling problems. AAAI Publications, Ninth Annual Symposium on Combinatorial Search. pp. 98-106 (SoCS 2016).
Trotter. On the product of semi-groups of operators. Proceedings of the American Mathematical Society 10(4):545-551 (1959).
U.S. Appl. No. 15/014,576 Office Action dated Dec. 26, 2017.
U.S. Appl. No. 15/014,576 Office Action dated Jul. 10, 2017.
U.S. Appl. No. 15/051,271 Office Action dated Mar. 13, 2018.
U.S. Appl. No. 15/051,271 Office Action dated Nov. 24, 2017.
U.S. Appl. No. 15/165,655 1st Action Interview dated Feb. 24, 2017.
U.S. Appl. No. 15/165,655 1st Action Interview dated Oct. 25, 2016.
U.S. Appl. No. 15/165,655 Office Action dated Jun. 2, 2017.
U.S. Appl. No. 15/486,960 Office Action dated Jun. 22, 2017.
U.S. Appl. No. 15/830,953 Office Action dated Feb. 14, 2018.
U.S. Appl. No. 15/831,967 Office Action dated Feb. 27, 2018.
Van Dam et al. How powerful is adiabatic quantum computation Proceedings 42nd IEEE Symposium on Foundations of Computer Science (pp. 279-287) (Oct. 2001).
Vinci et al. Quantum annealing correction with minor embedding. Physical Review A 92.4 (34 pgs) (Jul. 2015).
Levit et al. Free energy-based reinforcement learning using a quantum processor. Available at https://arxiv.org/pdf/1706.00074.pdf (May 2017) (8 pgs.).
PCT/CA2017/050637 International Preliminary Report on Patentability dated Dec. 6, 2018.
PCT/CA2017/050709 International Preliminary Report on Patentability dated Dec. 28, 2018.
PCT/CA2018/051531 International Search Report and Written Opinion dated Feb. 20, 2019.
PCT/CA2018/051534 International Search Report and Written Opinion dated Feb. 21, 2019.
Sepehry et al. Smooth Structured Prediction Using Quantum and Classical Gibbs Samplers. Available at https://1qbit.com/wp-content/uploads/2018/09/1QBit-Research-Paper-Smooth_Structured-Prediction-Using-Quantum-And_classical-Giobbs-Samplers.pdf (Accessed Feb. 20, 2018) (32 pgs).
Barends et al. Digitized adiabatic quantum computing with a superconducting circuit. Nature 534(7606):222-226 (2016).
U.S. Appl. No. 15/900,643 Miscellaneous Communication re: Third Party Submission dated Dec. 14, 2018.
U.S. Appl. No. 16/010,244 Miscellaneous Communication re: Third Party Submission dated Apr. 23, 2019.
U.S. Appl. No. 16/010,244 Office Action dated Jun. 10, 2019.
U.S. Appl. No. 16/162,249 Miscellaneous Communication re: Third Party Submission dated May 2, 2019.
U.S. Appl. No. 16/162,249 Office Action dated Jun. 12, 2019.
DWave, Reverse Quantum Annealing for Local Refinement of Solutions, D-Wave Whitepaper Series, Nov. 9, 2017. Retrieved online on Aug. 14, 2019 from https://www.dwavesys.com/sites/default/files/14-1018A-A_Reverse_Quantum_Annealing_for_Local_Refinement_Of_Solutions.pdf (2 pgs.).
McClean et al. The Theory of Variational Hybrid Quantum-Classical Algorithms, Institute of Physics. New Journal of Physics 18:023023. Retrieved online on Aug. 14, 2019 from https://iopscience.iop.org/article/10.1088/1367-2630/18/2/023023/ampdf (21 pgs) (2016).
McKiernan et al. Automated quantum programming via reinforcement learning for combinatorial optimization. Quantum Physics. arXiv.org quant-ph arXiv:1908.08054 (2019).
PCT/CA2019/050852 International Search Report and Written Opinion dated Aug. 15, 2019.
Svore et al. Toward a Software Architecture for Quantum Computing Design Tools. QPL 2004, pp. 127-144, Retrieved from the Internet: URL:https://www.microsoft.com/en-us/research/wp-content/uploads/2016/02/10Svore-Cros s-Aho-Chuang-Markov.pdf.
U.S. Appl. No. 16/010,244 Office Action dated Dec. 2, 2019.
U.S. Appl. No. 16/162,249 Office Action dated Dec. 2, 2019.
PCT/CA2019/051752 International Search Report and Written Opinion dated Mar. 17, 2020.

\* cited by examiner

METHODS AND SYSTEMS FOR QUANTUM COMPUTING

CROSS-REFERENCE

This application is a bypass continuation of International Application No. PCT/CA2017/50320, filed Mar. 10, 2017, which claims priority to U.S. Provisional Patent Application No. 62/307,296, filed Mar. 11, 2016, each of which is entirely incorporated by reference in its entirety.

BACKGROUND

Quantum computing studies theoretical computation systems (quantum computers) that may make direct use of quantum-mechanical phenomena, such as superposition and entanglement, to perform operations on data. Systems of superconducting qubits are disclosed, for instance, in U.S. Patent Application Publication Nos. US 2012/0326720 and US 2006/0225165, each of which is entirely incorporated herein by reference. Such analogue systems may be used for implementing quantum computing algorithms.

SUMMARY

Recognized herein is the need for a quantum-ready or quantum-enabled software development kit (SDK) that can broaden access to quantum computing while shielding users from the quantum 'machine code.' Fast and efficient analysis of large data sets may be essential in many fields, including financial analysis, social media, drug discovery, and job scheduling. Applications in these fields may frequently solve computationally expensive NP-complete and NP-hard problems. With the fast development of quantum computers, such as those by D-Wave Systems, Nippon Telegraph and Telephone (NTT), IBM, and Google, platform agnostic software, which may be compatible with both classical and quantum hardware, may be needed to enable users to leverage a pre-built library of algorithms and solvers.

Described herein is a software development kit (SDK) which may enable users to build quantum-ready or quantum-enabled solutions. Such solutions may be executed on any of a number of suitable platforms capable of performing quantum computing operations, such as a quantum computing system (e.g., a quantum annealer, an Ising solver, an optical parametric oscillator (OPO), a gate model of quantum computing, or another type of quantum computer). There are many challenges faced by the use of a quantum computer, such as embedding issues, manual errors, implementation effort cost, interfacing with hardware and optimizing to a polynomial unconstrained binary optimization (PUBO), e.g., a quadratic unconstrained binary optimization (QUBO). SDKs of the present disclosure may address these issues. To help address these challenges, a quantum-ready or quantum-enabled software development kit (SDK) is developed to be usable out-of-the-box or customized by advanced users, in which at least two or at least three layers, comprising an algorithms layer, binary polynomial layer, and a solver layer comprising a common interface, are provided to work together for providing solutions to an application input. Challenges in the design of the SDK are such that it may be implemented in various layers, such as an algorithms layer, a polynomial (e.g., binary) layer, and/or a common solver layer.

In one aspect, described herein is a method for generating one or more instructions for execution by a solver layer comprising a common interface, wherein the one or more instructions are generated by a digital computer comprising at least one computer processor and memory, the digital computer coupled to a quantum-ready or quantum-enabled computing system comprising the solver layer, and wherein the solver layer executes the one or more instructions to generate an output, the method comprising: a. accepting user input from an application at an application interface, which application is executed on the digital computer; b. implementing one or more algorithms, at an algorithms layer, that are solved heuristically or exactly depending at least in part on requirements of the user input, wherein the one or more algorithms abstract away a complexity of the application; c. transforming the one or more algorithms from the application space into the one or more instructions in polynomial unconstrained binary optimization (PUBO) form; and d. executing the one or more instructions in PUBO form at the common interface of the solver layer, wherein the common interface comprises one or more polynomial unconstrained binary optimization (PUBO) solvers that provide an interface that is agnostic to quantum or classical computers.

In some embodiments, the quantum-ready or quantum-enabled computing system comprises a quantum annealer, an Ising solver, an optical parametric oscillator (OPO), a gate model of quantum computing, or another type of quantum computer. In some embodiments, the polynomial unconstrained binary optimization (PUBO) form is a quadratic unconstrained binary optimization (QUBO) form. In some embodiments, the one or more polynomial unconstrained binary optimization (PUBO) solvers of the common interface of the solver layer comprise one or more quadratic unconstrained binary optimization (QUBO) solvers. In some embodiments, the one or more algorithms are transformed at the algorithms layer. In some embodiments, the one or more algorithms are transformed using a binary polynomial layer. In some embodiments, the one or more algorithms are transformed at a polynomial constrained integer optimization layer. In some embodiments, the one or more algorithms are transformed at a polynomial constrained binary optimization layer. In some embodiments, the one or more algorithms are transformed by the common interface of the solver layer. In some embodiments, the algorithms layer comprises one or more of: max (maximum) k-quasi clique, chromatic number, graph similarity, coloring feasibility, max co-k-plex, minimum clique cover, k-clique cover feasibility, linear knapsack, and balanced partitioning. In some embodiments, transforming the one or more algorithms comprises the use of one or more of: a transformation of the polynomial unconstrained binary optimization (PUBO) form to a quadratic unconstrained binary optimization (QUBO) form, binary polynomial operations, and efficient search in binary space. In some embodiments, the one or more polynomial unconstrained binary optimization (PUBO) solvers comprise one or more of: D-Wave, multi-agent Tabu 1-Opt solver, Tabu 1-Opt solver, PTICM solver, path-relinking solver, and a GPU-based simulated quantum annealing solver. In some embodiments, the one or more algorithms are implemented using a classical optimization system or a quantum oracle.

Also described herein is a system for generating one or more instructions for execution by a solver layer comprising a common interface, comprising: a. a quantum-ready or quantum-enabled computing system comprising the solver layer; b. a digital computer comprising at least one computer processor, the digital computer coupled to the quantum-ready or quantum-enabled computing system; c. a computer memory storing computer processor executable instructions which, when executed by the at least one computer processor, implement a method comprising: i. accepting user input from an application at an application interface, which application is executed on the digital computer; ii. implementing one or more algorithms, at an algorithms layer, that are solved heuristically or exactly depending at least in part on requirements of the user input, wherein the one or more algorithms abstract away a complexity of the application; iii. transforming the one or more algorithms from the application space into the one or more instructions in polynomial unconstrained binary optimization (PUBO) form; and iv. executing the one or more instructions in PUBO form at the common interface of the solver layer, wherein the common interface comprises one or more polynomial unconstrained binary optimization (PUBO) solvers that provide an interface that is agnostic to quantum or classical computers.

In some embodiments, the quantum-ready or quantum-enabled computing system comprises a quantum annealer, an Ising solver, an optical parametric oscillator (OPO), a gate model of quantum computing, or another type of quantum computer. In some embodiments, the polynomial unconstrained binary optimization (PUBO) form is a quadratic unconstrained binary optimization (QUBO) form. In some embodiments, the one or more polynomial unconstrained binary optimization (PUBO) solvers of the common interface of the solver layer comprise one or more quadratic unconstrained binary optimization (QUBO) solvers. In some embodiments, the one or more algorithms are transformed at the algorithms layer. In some embodiments, the one or more algorithms are transformed using a binary polynomial layer. In some embodiments, the one or more algorithms are transformed at a polynomial constrained integer optimization layer. In some embodiments, the one or more algorithms are transformed at a polynomial constrained binary optimization layer. In some embodiments, the one or more algorithms are transformed by the common interface of the solver layer. In some embodiments, wherein the algorithms layer comprises one or more of: max (maximum) k-quasi clique, chromatic number, graph similarity, coloring feasibility, max co-k-plex, minimum clique cover, k-clique cover feasibility, linear knapsack, and balanced partitioning. In some embodiments, transforming the one or more algorithms comprises the use of one or more of: a transformation of the polynomial unconstrained binary optimization (PUBO) form to a quadratic unconstrained binary optimization (QUBO) form, binary polynomial operations, and efficient search in binary space. In some embodiments, the one or more polynomial unconstrained binary optimization (PUBO) solvers comprise one or more of: D-Wave, multi-agent Tabu 1-Opt solver, Tabu 1-Opt solver, PTICM solver, path-relinking solver, and a GPU-based simulated quantum annealing solver. In some embodiments, the one or more algorithms are implemented using a classical optimization system or a quantum oracle.

Also described herein is a non-transitory computer-readable medium comprising machine-executable code that, upon execution by one or more computer processors, generates an application that is executable by a digital computer comprising at least one computer processor and memory to generate one or more instructions for execution by a solver layer of a quantum-ready or quantum-enabled computing system, the solver layer comprising a common interface, to generate an output, the application comprising: a. a software module programmed or otherwise configured to accept user input from an application at an application interface, which application is executed on the digital computer; b. a software module programmed or otherwise configured to implement one or more algorithms, at an algorithms layer, that are solved heuristically or exactly at least in part depending on the requirements of the user input, wherein the one or more algorithms abstract away a complexity of the application; c. a software module programmed or otherwise configured to transform the one or more algorithms from the application space into one or more instructions in polynomial unconstrained binary optimization (PUBO) form; and d. a software module programmed or otherwise configured to execute the one or more instructions in PUBO form at the common interface of the solver layer, wherein the common interface comprises one or more polynomial unconstrained binary optimization (PUBO) solvers that provide an interface that is agnostic to quantum or classical computers.

In some embodiments, the polynomial unconstrained binary optimization (PUBO) form is a quadratic unconstrained binary optimization (QUBO) form. In some embodiments, the one or more polynomial unconstrained binary optimization (PUBO) solvers of the common interface of the solver layer comprise one or more quadratic unconstrained binary optimization (QUBO) solvers. In some embodiments, the one or more algorithms are transformed at the algorithms layer. In some embodiments, the one or more algorithms are transformed using a binary polynomial layer. In some embodiments, the one or more algorithms are transformed by the common interface of the solver layer. In some embodiments, the algorithms layer comprises one or more of: max (maximum) k-quasi clique, chromatic number, graph similarity, coloring feasibility, max co-k-plex, minimum clique cover, k-clique cover feasibility, linear knapsack, and balanced partitioning. In some embodiments, the transforming of the one or more algorithms comprises the use of one or more of: a transformation of the polynomial unconstrained binary optimization (PUBO) form to a quadratic unconstrained binary optimization (QUBO) form, binary polynomial operations, and efficient search in binary space. In some embodiments, wherein the one or more polynomial unconstrained binary optimization (PUBO) solvers comprise one or more of: D-Wave, multi-agent Tabu 1-Opt solver, Tabu 1-Opt solver, PTICM solver, path-relinking solver, and a GPU-based simulated quantum annealing solver.

Additional aspects and advantages of the present disclosure will become readily apparent to those skilled in this art from the following detailed description, wherein only illustrative embodiments of the present disclosure are shown and described. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

INCORPORATION BY REFERENCE

All publications, patents, and patent applications mentioned in this specification are herein incorporated by reference to the same extent as if each individual publication, patent, or patent application was specifically and individually indicated to be incorporated by reference. To the extent publications and patents or patent applications incorporated by reference contradict the disclosure contained in the specification, the specification is intended to supersede and/or take precedence over any such contradictory material.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings (also "Figure" and "FIG." herein), of which:

DETAILED DESCRIPTION

Figure 1:
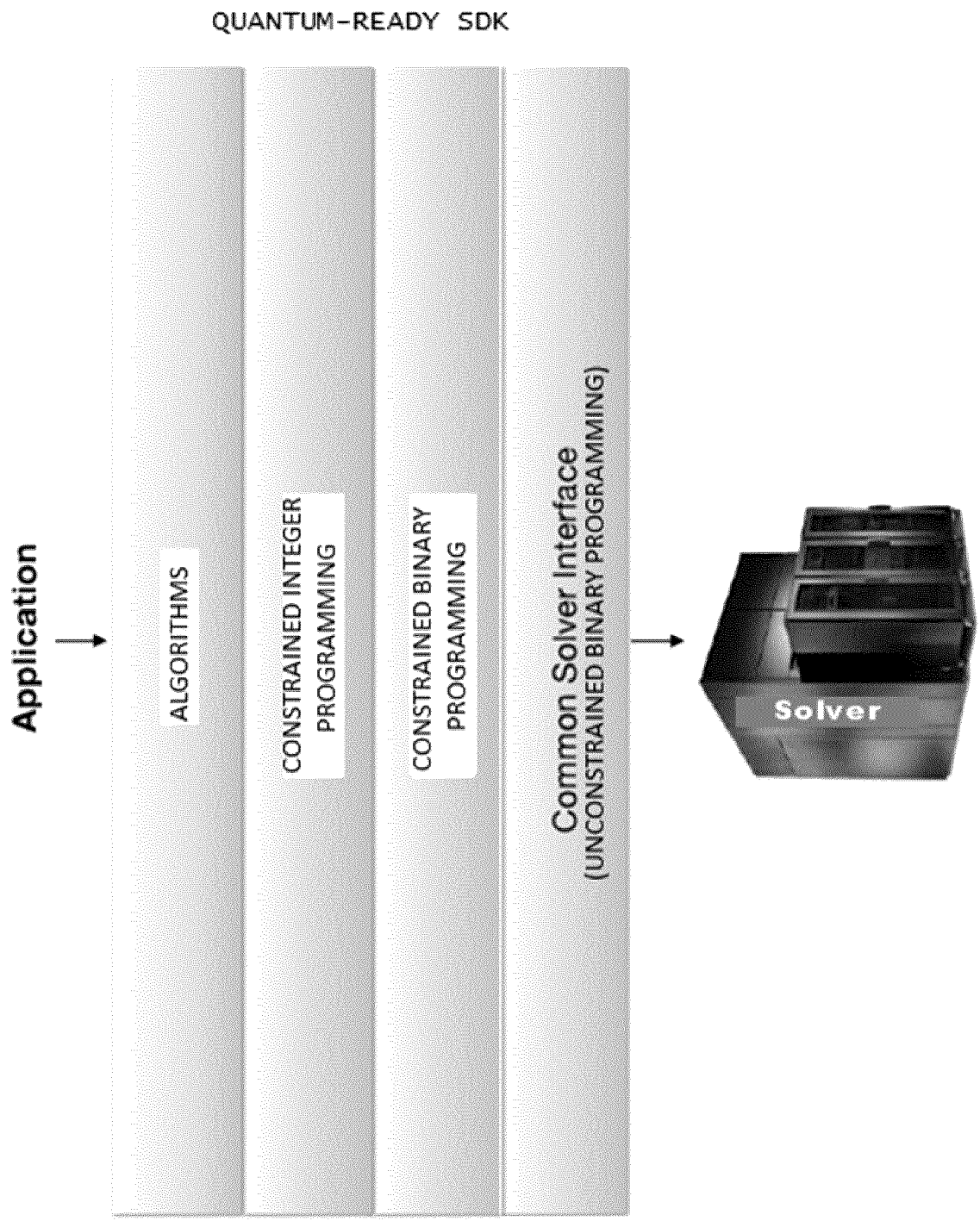
FIG. 1 shows a non-limiting example of an architecture of a quantum-ready or quantum-enabled software development kit (SDK); in this case, a three-layer architecture comprising an algorithms layer, binary polynomial layer, and a common solver interface layer (e.g., a solver layer comprising a common interface) that provides solutions to application based on a quantum computer.

While various embodiments of the invention have been shown and described herein, it will be obvious to those skilled in the art that such embodiments are provided by way of example only. Numerous variations, changes, and substitutions may occur to those skilled in the art without departing from the invention. It should be understood that various alternatives to the embodiments of the invention described herein may be employed.

To build a platform agnostic quantum-ready or quantum-enabled software development kit (SDK) that can broaden access to quantum computing while shielding users from the quantum 'machine code,' there may be many challenges that may need to be overcome. When developing applications for a quantum computer, for example, there may be embedding issues which may be complex, computationally expensive, and recurrent. There may also be manual errors comprising human error, non-trivial implementations, and debugging of errors. Another challenge may be the implementation effort, which may be labor intensive and time consuming, thereby limiting iterative testing of ideas. Interfacing with hardware may present other challenges such as faulty qubits, rapid evolution, and architectural changes. Furthermore, optimizing to a polynomial unconstrained binary optimization (PUBO) may present potentially time-consuming and recurring problems such as sub-optimal expertise in quadratic optimization (e.g., in the case of a QUBO), for example, if not every PUBO is suited to the underlying quantum computing system.

To overcome these challenges and to teach users to build quantum-ready or quantum-enabled solutions, the quantum-ready or quantum-enabled software development kit (SDK) described herein may enable users to leverage a pre-built library of algorithms and solvers. The SDK described may enable development of applications that are ready to interface with an adiabatic quantum computer (such as one produced by D-Wave Systems), an optical parametric oscillator (OPO) (such as one produced by Nippon Telegraph and Telephone (NTT)), or devices based on different technologies and architectures (such as those produced by IBM or Google). As quantum computers continue to evolve, the SDK integrates their advancements with highly efficient classical quadratic solvers to solve real-world problems. One of the challenges for this kind of SDK is to provide an extensive way to customize layers; hence, the described quantum-ready or quantum-enabled software development kit (SDK) has been designed in a multiple-layer architecture, wherein sophisticated users are able to control and add to lower layers according to their specific needs.

Described herein is a method that may be operative to generate one or more instructions for execution by a solver layer comprising a common interface, wherein the one or more instructions are generated by a digital computer comprising at least one computer processor and a memory, the digital computer coupled to a quantum-ready or quantum-enabled computing system comprising the solver layer, and wherein the solver layer executes the one or more instructions to generate an output, the method comprising: accepting user input from an application at an application interface, which application is executed on the digital computer; implementing one or more algorithms, at an algorithms layer, that are solved heuristically or exactly depending on the requirements of the user input, wherein the one or more algorithms abstract away a complexity of the application; transforming the one or more algorithms from the application space into one or more instructions in polynomial unconstrained binary optimization (PUBO) form; and executing the one or more instructions in PUBO form at the common interface of the solver layer, wherein the common interface comprises one or more polynomial unconstrained binary optimization (PUBO) solvers that provide an interface that is agnostic to quantum or classical computers.

Also described herein, in certain embodiments, is a system for generating one or more instructions for execution by a solver layer comprising a common interface, comprising: a quantum-ready or quantum-enabled computing system comprising the solver layer; a digital computer comprising at least one computer processor and a memory, the digital computer coupled to the quantum-ready or quantum-enabled computing system; a computer memory storing computer processor executable instructions which, when executed by the at least one computer processor, implement a method comprising: accepting user input from an application at an application interface, which application is executed on the digital computer; implementing one or more algorithms, at an algorithms layer, that are solved heuristically or exactly depending on the requirements of the user input, wherein the one or more algorithms abstract away a complexity of the application; transforming the one or more algorithms from the application space into the one or more instructions in polynomial unconstrained binary optimization (PUBO) form; and executing the one or more instructions in PUBO form at the common interface of the solver layer, wherein the common interface comprises one or more polynomial unconstrained binary optimization (PUBO) solvers that provide an interface that is agnostic to quantum or classical computers.

Also described herein, in certain embodiments, is a non-transitory computer-readable medium comprising machine-executable code that, upon execution by one or more computer processors, generates an application that is executable by a digital computer comprising at least one computer processor and memory to generate one or more instructions for execution by a solver layer of a quantum-ready or quantum-enabled computing system, the solver layer comprising a common interface, to generate an output, the application comprising: a software module programmed or otherwise configured to accept user input from an application at an application interface, which application is executed on the digital computer; a software module programmed or otherwise configured to implement one or more algorithms, at an algorithms layer, that are solved heuristically or exactly depending on the requirements of the user input, wherein the one or more algorithms abstract away a complexity of the application; a software module programmed or otherwise configured to transform the one or more algorithms from the application space into one or more instructions in polynomial unconstrained binary optimization (PUBO) form; and a software module programmed or otherwise configured to execute the one or more instructions in PUBO form at the common interface of the solver layer, wherein the common interface comprises one or more polynomial unconstrained binary optimization (PUBO) solvers that provide an interface that is agnostic to quantum or classical computers.

Described herein, in certain embodiments, is a system for storing data, comprising: a quantum computing system that stores data as quantum bits; and one or more computer processors coupled to the quantum computing system, wherein the one or more computer processors are individually or collectively programmed to: accept user input from an application at an application interface; responsive to the user input, use one or more algorithms to generate one or more instructions for the quantum computing system, which one or more instructions are from a database comprising instructions for a plurality of types of quantum computing systems comprising the quantum computing system; and instruct the quantum computing system to perform the one or more instructions.

Unless otherwise defined, all technical terms used herein have the same meaning as commonly understood by one of ordinary skill in the art to which this invention belongs. As used in this specification and the appended claims, the singular forms "a," "an," and "the" include plural references unless the context clearly dictates otherwise. Any reference to "or" herein is intended to encompass "and/or" unless otherwise stated.

The term "qubit" and like terms generally refer to any physical implementation of a quantum mechanical system represented on a Hilbert space and realizing at least two distinct and distinguishable eigenstates representative of the two states of a quantum bit. A quantum bit is the analogue of the digital bits, where the ambient storing device may store two states $|0\rangle$ and $|1\rangle$ of a two-state quantum information, but also in superpositions $$\alpha|0\rangle + \beta|1\rangle$$

of the two states. In various embodiments, such systems may have more than two eigenstates in which case the additional eigenstates are used to represent the two logical states by degenerate measurements. Various embodiments of implementations of qubits have been proposed; e.g. solid state nuclear spins, measured and controlled electronically or with nuclear magnetic resonance, trapped ions, atoms in optical cavities (cavity quantum-electrodynamics), liquid state nuclear spins, electronic charge or spin degrees of freedom in quantum dots, superconducting quantum circuits based on Josephson junctions [Barone and Paternò, 1982, *Physics and Applications of the Josephson Effect*, John Wiley and Sons, New York; Martinis et al., 2002, *Physical Review Letters* 89, 117901] and electrons on Helium.

The term "system of superconducting qubits" and like terms generally refer to a quantum mechanical system comprising a plurality of qubits and a plurality of couplings between a plurality of pairs of the plurality of qubits, and further comprising a quantum device control system.

The term "quantum computer" generally refers to a computer capable of performing computation using quantum bits (qubits), which can be in superpositions of states. A quantum Turing machine is a theoretical model of such a quantum computer, and is also known as the universal quantum computer. Quantum computers share theoretical similarities with non-deterministic and probabilistic computers.

In some embodiments, a quantum computer comprises one or more quantum processors. A quantum computer may be configured to perform one or more quantum algorithms. A quantum computer may be able to solve certain problems much more quickly than any classical computers that use even the best currently known algorithms, like integer factorization using Shor's algorithm or the simulation of quantum many-body systems. There exist quantum algorithms, such as Simon's algorithm, that run faster than any possible probabilistic classical algorithm. Examples of quantum algorithms include, but are not limited to, quantum optimization algorithms, quantum Fourier transforms, amplitude amplifications, quantum walk algorithms, and quantum evolution algorithms. Quantum computers may be able to efficiently solve problems that no classical computer may be able to solve within a reasonable amount of time. Thus, a quantum computer disclosed herein may utilize the merits of quantum computing resources to solve complex problems.

Any type of quantum computer may be suitable for the technologies disclosed herein. Examples of quantum computers include, but are not limited to, adiabatic quantum computers, quantum gate arrays, one-way quantum computer, topological quantum computers, quantum Turing machines, superconductor-based quantum computers, trapped ion quantum computers, optical lattices, quantum dot computers, spin-based quantum computers, spatial-based quantum computers, Loss-DiVincenzo quantum computers, nuclear magnetic resonance (NMR) based quantum computers, liquid-NMR quantum computers, solid state NMR Kane quantum computers, electrons-on-helium quantum computers, cavity-quantum-electrodynamics based quantum computers, molecular magnet quantum computers, fullerene-based quantum computers, linear optical quantum computers, diamond-based quantum computers, Bose-Einstein condensate-based quantum computers, transistor-based quantum computers, and rare-earth-metal-ion-doped inorganic crystal based quantum computers.

A system of the present disclosure may include or employ quantum-ready or quantum-enabled computing systems. A quantum-ready computing system may comprise a digital computer operatively coupled to a quantum computer. The quantum computer may be configured to perform one or more quantum algorithms. The digital computer may comprise a memory and at least one computer processor. The computer memory may include a computer program with instructions executable by the at least one computer processor to render an application. The application may facilitate use of the quantum computer by a user. A quantum-enabled computing system may comprise a quantum computer and a classical computer, the quantum computer and the classical computer operatively coupled to a digital computer. The quantum computer may be configured to perform one or more quantum algorithms for solving a computational problem. The classical computer may comprise at least one classical processor and computer memory, and may be configured to perform one or more classical algorithms for solving a computational problem. The digital computer may comprise at least one computer processor and computer memory, wherein the digital computer may include a computer program with instructions executable by the at least one computer processor to render an application. The application may facilitate use of the quantum computer and/or the classical computer by a user.

The term "quantum computing system" and like terms generally refer to a system capable of making use of quantum-mechanical phenomena, such as superposition and entanglement, to perform quantum computing operations. A quantum computing system may comprise a quantum-ready computing system. A quantum computing system may comprise a quantum-enabled computing system. A quantum computing system may comprise, for example, a quantum annealer, an Ising solver, an optical parametric oscillator (OPO), a gate model of quantum computing, or another type of quantum computer. Quantum computing systems may be different from digital electronic computers based on transistors. For instance, whereas digital computers require data to be encoded into binary digits (bits), each of which is always in one of two definite states (0 or 1), quantum computation uses quantum bits (qubits), which can be in superpositions of states. It is appreciated that a system of superconducting qubits may be manufactured in various embodiments. In some embodiments, a system of superconducting qubits is a "quantum annealer."

Quantum computers (or other types of non-classical computers) may be able to work alongside classical computers as co-processors. The hybrid architecture of quantum-enabled computation can be very efficient for addressing complex computational tasks, like hard optimization problems.

The term "quantum annealer" and like terms generally refer to a system of superconducting qubits that carries optimization of a configuration of spins in an Ising spin model using quantum annealing, as described, for example, in Farhi, E. et al., "Quantum Adiabatic Evolution Algorithms versus Simulated Annealing" arXiv.org: quant ph/0201031 (2002), pp. 1-16. An embodiment of such an analog processor is disclosed by McGeoch, Catherine C. and Cong Wang, (2013), "Experimental Evaluation of an Adiabatic Quantum System for Combinatorial Optimization" Computing Frontiers," May 14-16, 2013 (http://www.cs.amherst.edu/ccm/cf14-mcgeoch.pdf) and also disclosed in U.S. Patent Application Publication Number US 2006/0225165.

Multiple-Layer Architecture Software Development Kit (SDK)

In some embodiments, the methods, systems, and media described herein comprise a multiple-layer architecture software development kit (SDK), or use of the same. In some embodiments, the multiple-layer architecture software development kit (SDK) comprises a two-layer structure. In some embodiments, the multiple-layer architecture software development kit (SDK) comprises a three-layer structure. In some embodiments, the multiple-layer architecture software development kit (SDK) comprises a four or more-layer structure.

In some embodiments, the multiple-layer architecture software development kit (SDK) is targeted to audiences such as data analysts comprising business analysts, risk analysts, financial analysts, and social network analysts; application developers comprising software engineers and programmers; and optimization experts comprising engineers, mathematicians, physicists, and graph theorists. In some embodiments, applications in these fields may frequently solve computationally expensive NP-complete and NP-hard problems.

In some embodiments, the three-layer architecture software development kit (SDK) integrates their advancements with highly efficient classical quadratic solvers to solve these NP-complete and NP-hard problems. In some embodiments, the quantum-ready or quantum-enabled SDK's multilayered architecture may abstract away the complexity of solving NP-complete and NP-hard problems, while providing sufficient access for more advanced developers to customize solving mechanisms.

Three-Layer Architecture Software Development Kit (SDK)

In some embodiments, the methods, systems, and media described herein comprise a three-layer architecture software development kit (SDK), or use of the same. In some embodiments, the three-layer architecture software development kit (SDK) comprises an algorithms layer, binary polynomial layer, and a common solver interface layer. In some embodiments, an algorithms layer is used to implement one or more algorithms that are solved heuristically or exactly depending on the requirements of the user input, wherein the one or more algorithms abstract away a complexity of the application. In some embodiments, a binary polynomial layer is used to transform the one or more algorithms from the application space into one or more instructions in polynomial unconstrained binary optimization (PUBO) form. Instructions in PUBO form are generally directed toward minimization of polynomial functions of a degree in n$\{0,1\}$-valued variables. This degree may be 1. This degree may be greater than or equal to 2. An example of a PUBO form is a quadratic unconstrained binary optimization (QUBO) form. Instructions in QUBO form are generally directed toward minimization of quadratic polynomial functions (e.g., polynomials of degree 2) in n$\{0,1\}$-valued variables. Other types of PUBO forms may be used, such as PUBO forms with polynomials of degree greater than 2. In some embodiments, a common solver interface layer is used to execute the one or more instructions in PUBO form, wherein the common solver interface layer comprises one or more polynomial unconstrained binary optimization (PUBO) solvers that provide an interface that is agnostic to quantum or classical computers. Gate model quantum computers, for example, can solve polynomial unconstrained binary optimization (PUBO) forms of degree greater than 2. New generations of adiabatic quantum annealers may solve these problems natively without using in-software conversion to a quadratic form.

Referring to FIG. 1, in a particular embodiment, a three-layer architecture is presented comprising an algorithms layer, binary polynomial layer, and a common solver interface layer that provides solutions to application based on a quantum computer. In particular, the algorithms layer is the higher layer that connects to the application and accepts user application input; while the common solver interface layer is the lowest layer of the SDK comprising various PUBO problem solvers that expose a common interface to the upper layers of the SDK.

Figure 2:
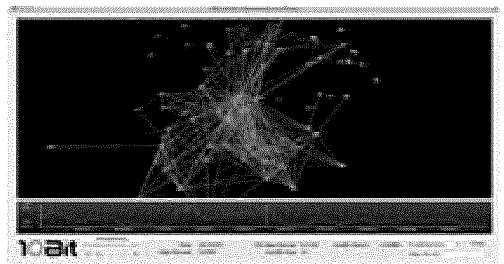
FIG. 2 shows a non-limiting example of an architecture of a quantum-ready or quantum-enabled software development kit (SDK); in this case, another embodiment of a three-layer architecture comprising an algorithms layer, a binary polynomial layer (e.g., comprising constrained integer programming or constrained binary programming), and a common solver interface layer (e.g., a solver layer comprising a common interface) that provides solutions to application based on a quantum computer.
Figure 2:
Figure 2:
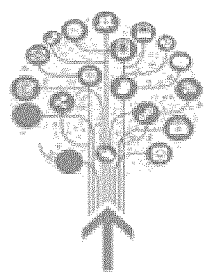
Figure 2:
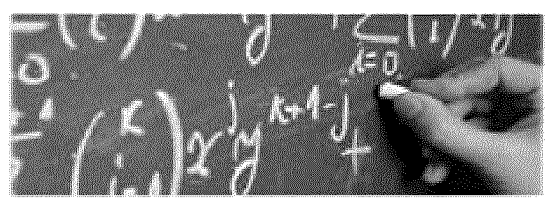
Figure 2:
Figure 2:
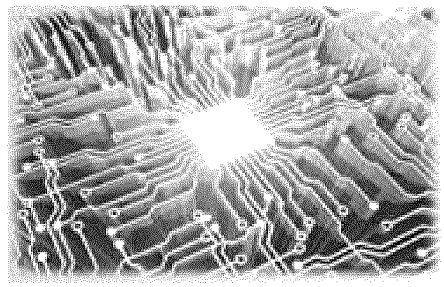

Referring to FIG. 2, in a particular embodiment, another embodiment of a three-layer architecture is presented comprising an algorithms layer, a binary polynomial layer (e.g., comprising constrained integer programming or constrained binary programming), and a common solver interface layer (e.g., a solver layer comprising a common interface) that provides solutions to application based on a quantum computer.

Figure 6:
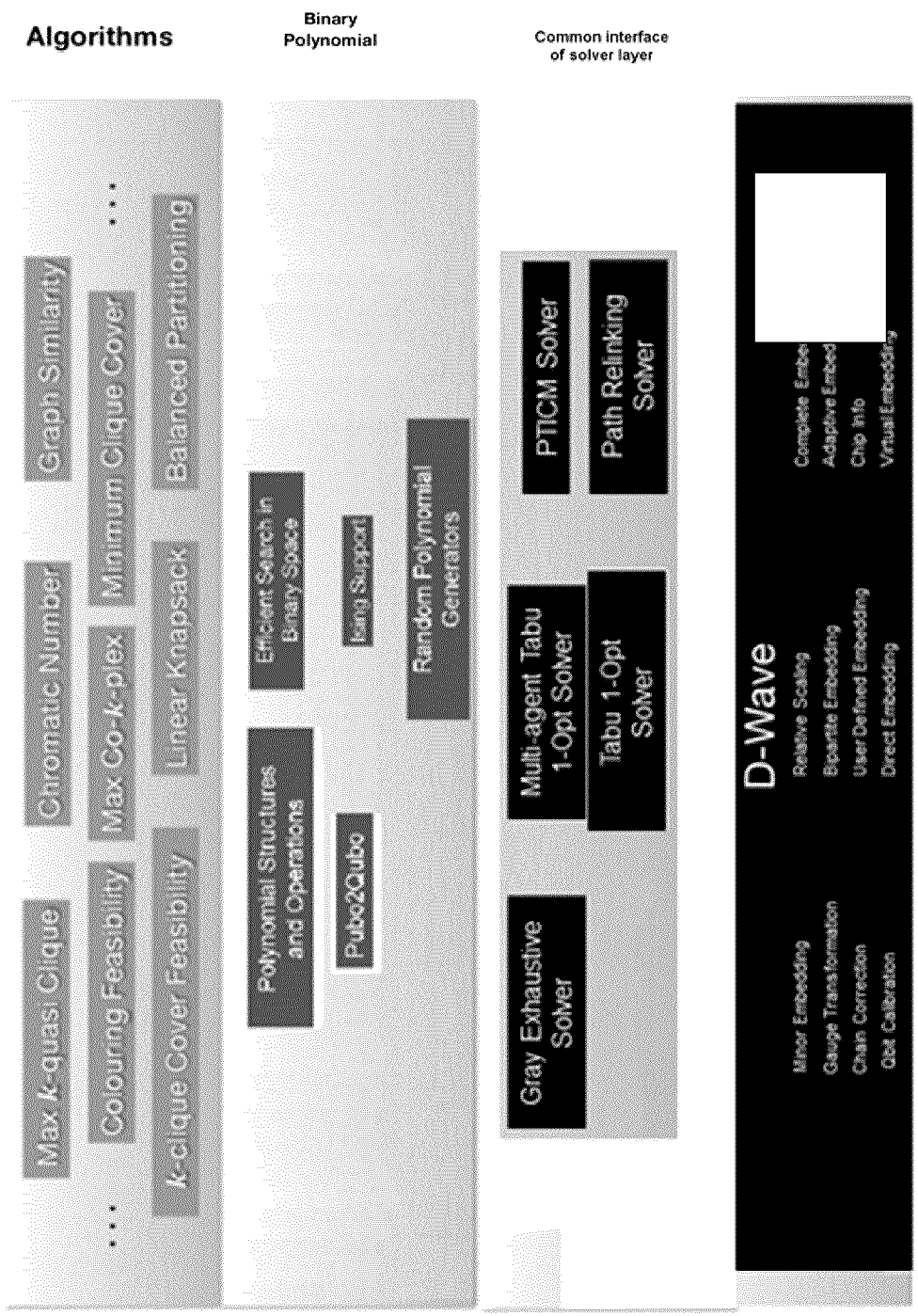
FIG. 6 shows a non-limiting example of an architecture of a quantum-ready or quantum-enabled software development kit (SDK); in this case, a three-layer architecture comprising, for example, an algorithms layer, a binary polynomial layer, and a common solver interface layer displayed with respective components.

Referring to FIG. 6, in a particular embodiment, a three-layer architecture is demonstrated comprising an algorithms layer, a binary polynomial layer, and a common solver interface layer displayed with respective components. In particular, the algorithms layer comprises one or more suitable algorithm components of: max k-quasi clique, chromatic number, graph similarity, coloring feasibility, max co-k-plex, minimum clique cover, k-clique cover feasibility, linear knapsack and balanced partitioning. The binary polynomial layer comprises the use of one or more suitable transforming components of: a transformation of the PUBO to a QUBO (Pubo2Qubo), Ising Support, polynomial structures and operations, efficient search in binary space, and random polynomial generators. The polynomial unconstrained binary optimization (PUBO) solvers comprise one or more of: D-Wave, gray exhaustive solver, multi-agent Tabu 1-Opt solver, Tabu 1-Opt solver, PTICM solver, path-relinking solver, and a GPU-based simulated quantum annealing solver.

In some embodiments, the quantum-ready or quantum-enabled SDK may be highly optimized and benefits from state-of-the-art heuristics and techniques for solving optimization problems. In some embodiments, the modular design may allow developers to further extend the SDK by adding their own algorithms and solvers.

Two-Layer Architecture Software Development Kit (SDK)

In some embodiments, the methods, systems, and media described herein comprise a two-layer architecture software development kit (SDK), or use of the same. In some embodiments, the two-layer architecture software development kit (SDK) comprises an algorithms layer and a common solver interface layer. In this alternative two-layer architecture, the function of the binary polynomial layer in a three-layer architecture SDK, which may be to transform the one or more algorithms, may be implemented in either one of the two layers. In some embodiments, the one or more algorithms are transformed using a binary polynomial layer. In some other embodiments, the one or more algorithms are transformed by the common interface of the solver layer.

In some embodiments, the algorithms layer in the two-layer architecture SDK completes the functions of both an algorithms layer and a binary polynomial layer in a three-layer architecture SDK. In further embodiments, the algorithms layer is used to implement one or more algorithms that are solved heuristically or exactly depending on the requirements of the user input, wherein the one or more algorithms abstract away a complexity of the application. In further embodiments, the algorithms layer is also used to transform the one or more algorithms from the application space into one or more instructions in polynomial unconstrained binary optimization (PUBO) form. In some embodiments, the common solver interface layer is used to execute the one or more instructions in PUBO form, wherein the common solver interface layer comprises one or more polynomial unconstrained binary optimization (PUBO) solvers that provide an interface that is agnostic to quantum or classical computers.

In some embodiments, the common solver interface layer in the two-layer architecture SDK completes the functions of both a binary polynomial layer and a common solver interface layer in a three-layer architecture SDK. In further embodiments, the common solver interface layer is used to transform the one or more algorithms from the application space into one or more instructions in polynomial unconstrained binary optimization (PUBO) form. In further embodiments, the common solver interface layer is used to execute the one or more instructions in PUBO form, wherein the common solver interface layer comprises one or more polynomial unconstrained binary optimization (PUBO) solvers that provide an interface that is agnostic to quantum or classical computers. In some embodiments, the algorithms layer is used to implement one or more algorithms that are solved heuristically or exactly depending on the requirements of the user input, where the one or more algorithms abstract away a complexity of the application.

Algorithms Layer

In some embodiments, the methods, systems, and media described herein comprise an algorithms layer, or use of the same. In some embodiments, an algorithms layer may be used to implement one or more algorithms that are solved heuristically or exactly depending on the requirements of the user input, wherein the one or more algorithms abstract away a complexity of the application.

In some embodiments, this algorithms layer provides the highest level of abstraction in the SDK. The users of the algorithms layer only need to care about high-level algorithms. How these algorithms translate to a PUBO and the way the PUBO is solved may be abstracted away by the algorithms layer.

Developers in many fields encounter NP-complete and NP-hard problems. In some embodiments, the algorithms layer in the SDK is where numerous algorithms have been implemented that can be solved heuristically or exactly depending on the application's requirements. In effect, this may abstract away the problem's complexity from developers. A few of the many problems for which algorithms exist at this layer include partitioning, travelling salesman, minimum spanning tree, and maximum quasi-clique.

In some embodiments, the input and output of each algorithm is more important than its description as it defines how the users work with each component. In some embodiments, the users of the algorithms layer do not need to deal with polynomial optimization, which is the basis for PUBOs. In some embodiments, the users of the algorithms layer do not deal directly with quantum annealer, such as a D-Wave system.

Figure 3:
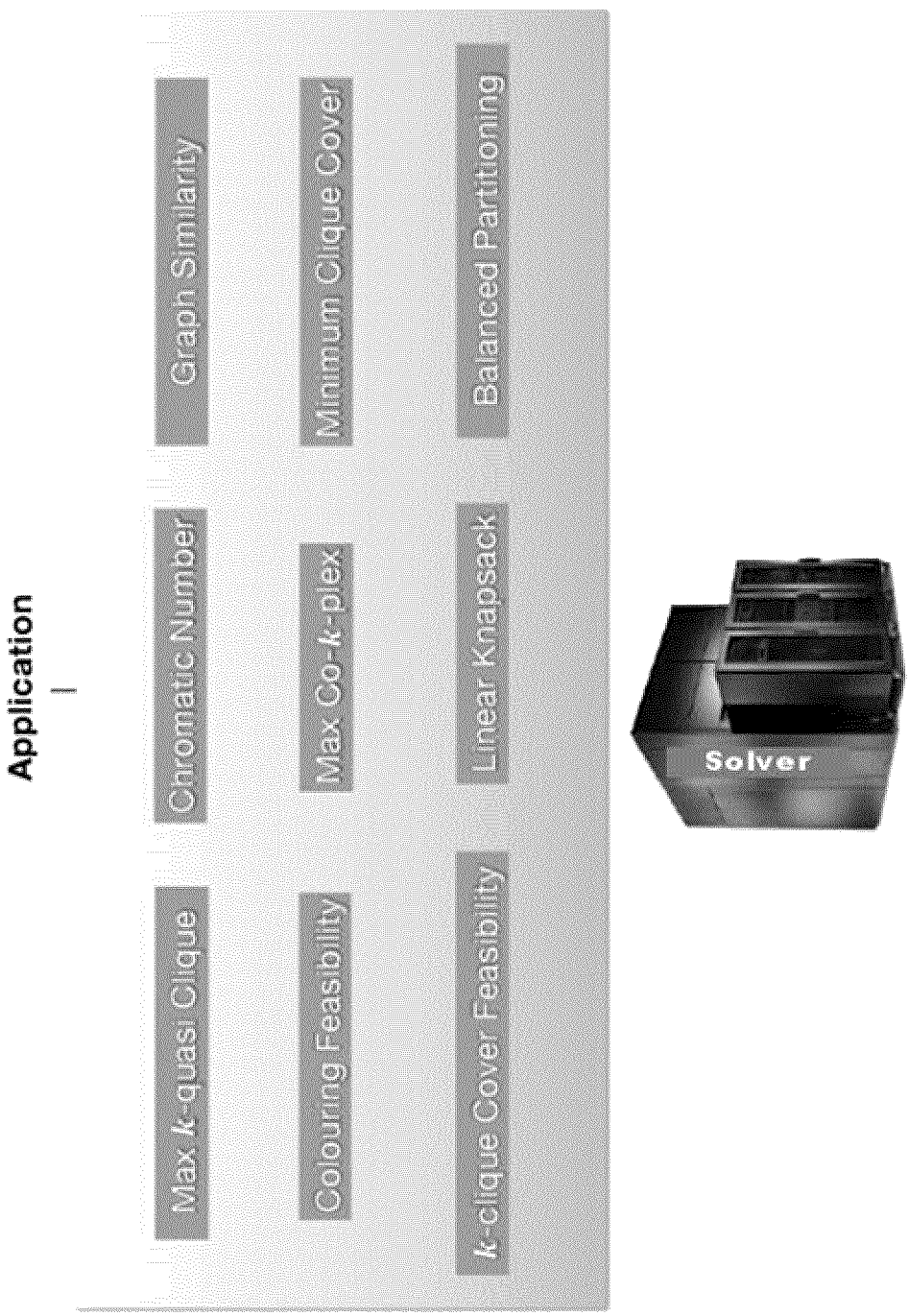
FIG. 3 shows a non-limiting example of an architecture of a quantum-ready or quantum-enabled software development kit (SDK); in this case, an algorithms layer comprising components comprising one or more algorithms, such as, for example, one or more of: max (maximum) k-quasi clique, chromatic number, graph similarity, coloring feasibility, max co-k-plex, minimum clique cover, k-clique cover feasibility, linear knapsack, and balanced partitioning.

In some embodiments, the algorithms used in the algorithms layer comprise one or more of: max k-quasi clique, chromatic number, graph similarity, coloring feasibility, max co-k-plex, minimum clique cover, k-clique cover feasibility, linear knapsack and balanced partitioning. Referring to FIG. 3, in a particular embodiment, various non-limiting examples of types of algorithm components that are suitable for the algorithms layer are demonstrated. In some embodiments, by adding new algorithms to the algorithms layer, the quantum-ready or quantum-enabled software development kit is continually extended for new applications.

In some embodiments, max k-quasi clique may be used as one of the components in the algorithms layer. In some embodiments, the max k-quasi clique component is a graph algorithm used to find dense parts of a graph wherein the users input a graph and receive a list of nodes in the dense subgraph.

In some embodiments, a chromatic number may be used as one of the components in the algorithms layer. In some embodiments, the chromatic number component is a graph algorithm used to color the nodes of a graph such that no nodes adjacent have the same color, wherein the input is a graph and the output is a coloring of the graph wherein a coloring is a mapping of colors to nodes of the graph.

In some embodiments, graph similarity may be used as one of the components in the algorithms layer. In some embodiments, the graph similarity component is a graph algorithm wherein the input is two graphs and the output is the similar substructures of the graph. In some embodiments, graph similarity internally uses one of the other components in the algorithms layer.

In some embodiments, linear knapsack may be used as one of the components in the algorithms layer. In some embodiments, the linear knapsack component is an algorithm used to solve a popular combinatorial optimization problem used in portfolio and investment selection, wherein the inputs are a set of items and their weights and prices, and the output is a maximum gain obtained by choosing the best (e.g., optimal) set of items.

In some embodiments, an algorithms layer is used to transform the one or more algorithms from the application space into one or more instructions in polynomial unconstrained binary optimization (PUBO) form.

Binary Polynomial Layer

In some embodiments, the methods, systems, and media described herein comprise a binary polynomial layer, or use of the same. In some embodiments, a binary polynomial layer is used to transform the one or more algorithms from the application space into one or more instructions in polynomial unconstrained binary optimization (PUBO) form.

In some embodiments, a binary polynomial layer helps users more easily model their problems into PUBO form, which is the problem format that solvers in a common solver interface can solve. In some embodiments, the binary polynomial layer provides an easy-to-use mechanism for algorithm developers to transform the problems from their application space into polynomial form and prepare them to be sent to the common solver interface layer.

Figure 4:
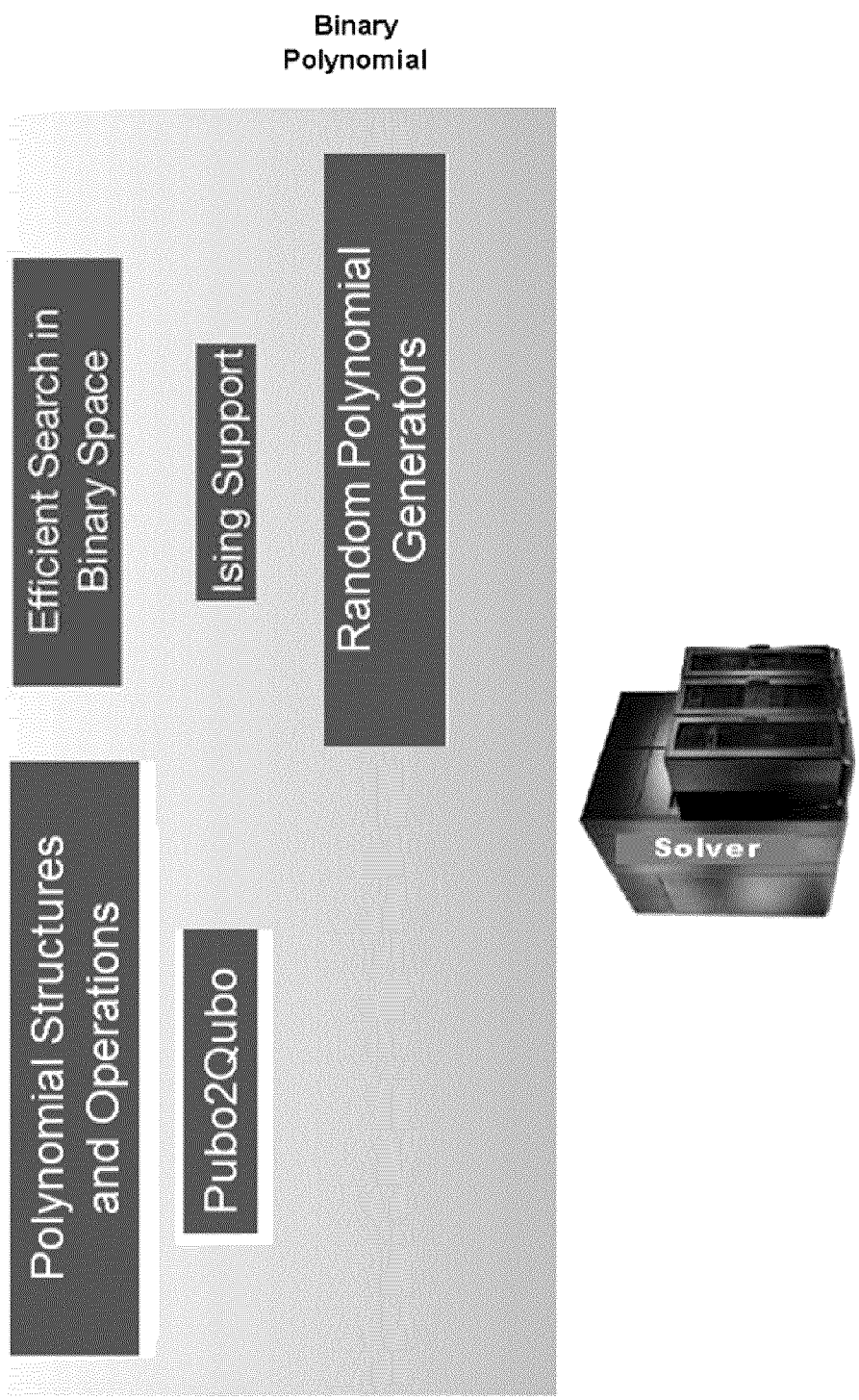
FIG. 4 shows a non-limiting example of an architecture of a quantum-ready or quantum-enabled software development kit (SDK); in this case, a binary polynomial layer comprising one or more components comprising, for example, one or more of: a transformation of the PUBO to a QUBO (Pubo2Qubo), Ising Support, polynomial structures and operations, efficient search in binary space, and random polynomial generators.

In some embodiments, the transforming of the one or more algorithms comprises the use of one or more of: a transformation of the PUBO to a QUBO, Ising Support, binary polynomial operations, and efficient search in binary space. Referring to FIG. 4, in a particular embodiment, various non-limiting examples of types of transforming components that are suitable for the binary polynomial layer are demonstrated, such as a transformation of the PUBO to a QUBO (Pubo2Qubo), Ising Support, polynomial structures and operations, efficient search in binary space, and random polynomial generators.

In some embodiments, a transformation of the PUBO to a QUBO (Pubo2Qubo) technique is used as one of the components for the binary polynomial layer. In some embodiments, the transformation of the PUBO to a QUBO component is used when a polynomial needs to be of degree at most 2 to be solvable directly by D-Wave. In further embodiments, this module automates the process of transforming a higher-level optimization problem into a polynomial of degree at most 2.

In some embodiments, Ising support technique is used as one of the components for the binary polynomial layer. In some embodiments, the Ising support component is used when there is a linear transformation from a PUBO to Ising model or vice versa. In some embodiments, the Ising model is the actual problem that is solved by the quantum annealer (D-Wave). In further embodiments, the transformation between PUBO and Ising model is provided by this component.

In some embodiments, binary polynomial operations are used as one of the components for the binary polynomial layer. In some embodiments, the binary polynomial operations component allows the users to easily work with binary polynomials, wherein operations like adding, multiplying, power, etc. are provided in the binary polynomial layer. These are useful tools when creating the PUBO that is to be sent to the lower common solver interface layer.

Common Solver Interface Layer

In some embodiments, the methods, systems, and media described herein comprise a common solver interface layer, or use of the same. In some embodiments, a common solver interface layer is used to execute the one or more instructions in PUBO form, wherein the common solver interface layer comprises one or more polynomial unconstrained binary optimization (PUBO) solvers that provide an interface that is agnostic to quantum or classical computers.

In some embodiments, the common solver interface layer is the lowest layer of the SDK comprising various polynomial unconstrained binary optimization (PUBO) problem solvers. In some embodiments, these solvers expose a common interface to the upper layers of the SDK, so that a chosen PUBO solver may be easily switched for another, based on the requirements of the application, with little or no modification to the code.

In some embodiments, the common solver interface layer is the closest to the underlying hardware, be it a classical computer or a quantum annealer. In some embodiments, the common solver interface layer servers the purpose of making D-Wave an oracle PUBO solver so that the users do not need to manage the complexities of hardware. In some embodiments, the common solver interface layer serves the purpose of allowing development of quantum-ready or quantum-enabled applications by providing a common interface to the quantum hardware and classical PUBO solvers. In some embodiments, the underlying solver in the common solver interface layer is able to be switched from quantum to classical or vice versa, leaving the application-level code intact. In some embodiments, the same application, if run on top of the SDK, is able to run on either a quantum or a classical computer.

Figure 5:
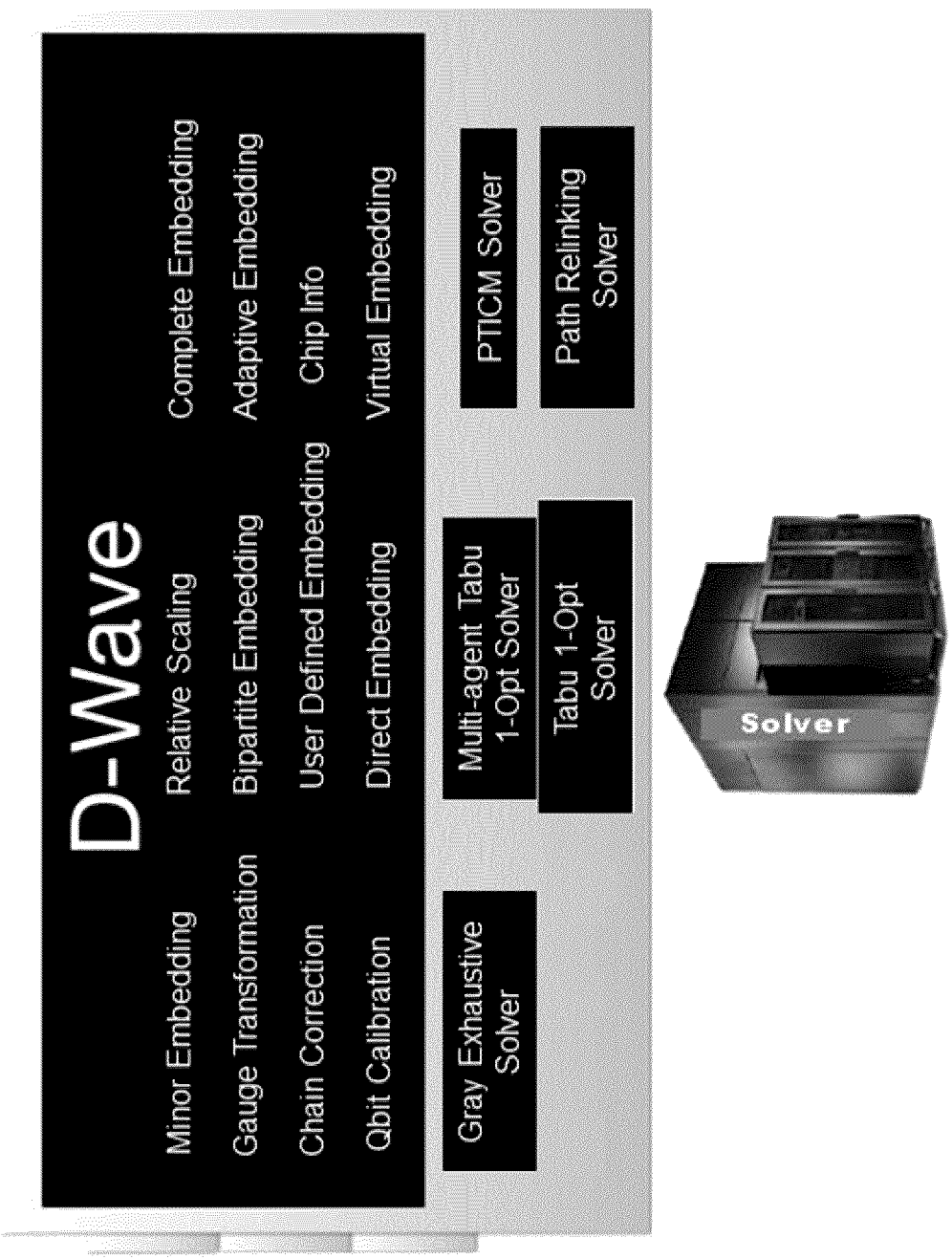
FIG. 5 shows a non-limiting example of an architecture of a quantum-ready or quantum-enabled software development kit (SDK); in this case, a common interface of the solver layer comprising one or more polynomial unconstrained binary optimization (PUBO) solvers, such as, for example, one or more of: D-Wave, gray exhaustive solver, multi-agent Tabu 1-Opt solver, Tabu 1-Opt solver, PTICM solver, and path-relinking solver.

In some embodiments, the polynomial unconstrained binary optimization (PUBO) solvers used by the common solver interface layer comprise one or more of: D-Wave, gray exhaustive solver, multi-agent Tabu 1-Opt solver, Tabu 1-Opt solver, PTICM solver, path-relinking solver, and a GPU-based simulated quantum annealing solver. Referring to FIG. 5, in a particular embodiment, various non-limiting examples of types of PUBO solvers that are suitable for the common solver interface layer are demonstrated.

In some embodiments, a particular solver component is used in the common solver interface layer as a software wrapper that connects to D-Wave. In some embodiments, this D-Wave solver component abstracts away the complexities of directly interfacing with hardware. In some embodiments, this D-Wave solver component makes use of helper modules to achieve simplicity and provide an easy-to-use interface. In some embodiments, this D-Wave solver component comprises a complete embedding module, wherein embedding is a complex problem that needs to be solved every time a QUBO is to be solved on D-Wave. In further embodiments, this module provides users with pre-calculated general embedding so that they do not have to worry about solving that problem every time. In some embodiments, this D-Wave solver component comprises a virtual embedding module. In further embodiments, this module is used to allow users to reuse their previously calculated embedding to speed up the embedding process. In some embodiments, this D-Wave solver component comprises a chip information module. In further embodiments, this module is used to provide user friendly statistics and information about the status of the chip and the architecture.

In some embodiments, a gray exhaustive component is used in the common solver interface layer as an exhaustive exact PUBO solver. In some embodiments, the solver provides the same interface as D-Wave does, and since the solver is an exact solver, it is used to verify the correctness of problem modeling.

In some example, a heuristic solver may be used. For example, a Tabu 1-opt component, may be used in the common solver interface layer as a heuristic PUBO solver. The Tabu 1-opt solver may provide an interface that is similar to a D-Wave interface. The Tabu 1-opt solver may be able to solve PUBOs with many more variables than D-Wave. The Tabu 1-opt solver may not guarantee the optimality of the solution. The Tabu 1-opt solver may be a heuristic approach similar to what is currently used with classical computers to solve problems that are solvable using D-Wave.

In some embodiments, a GPU-based simulated quantum annealing solver is used in the common solver interface layer as an exhaustive exact PUBO solver. In some embodiments, a GPU-based simulated quantum annealing solver is used in the common solver interface layer as a heuristic PUBO solver.

In some embodiments, a common solver interface layer is used to transform the one or more algorithms from the application space into one or more instructions in unconstrained binary optimization (PUBO) form.

Digital Processing Device

In some embodiments, the quantum-ready or quantum-enabled software development kit (SDK) described herein comprises a digital processing device, or use of the same. In further embodiments, the digital processing device comprises one or more hardware central processing units (CPUs) that carry out the device's functions. In still further embodiments, the digital processing device further comprises an operating system configured to perform executable instructions. In some embodiments, the digital processing device is optionally connected to a computer network. In further embodiments, the digital processing device is optionally connected to the Internet such that the digital processing device accesses the World Wide Web. In still further embodiments, the digital processing device is optionally connected to a cloud computing infrastructure. In other embodiments, the digital processing device is optionally connected to an intranet. In other embodiments, the digital processing device is optionally connected to a data storage device.

In accordance with the description herein, suitable digital processing devices comprise, for example, server computers, desktop computers, laptop computers, notebook computers, subnotebook computers, netbook computers, netpad computers, set-top computers, media streaming devices, handheld computers, Internet appliances, mobile smartphones, tablet computers, personal digital assistants, video game consoles, or vehicles. Those of skill in the art will recognize that many smartphones may be suitable for use with the system described herein. Those of skill in the art will also recognize that select televisions, video players, and digital music players with optional computer network connectivity may be suitable for use with the system described herein. Suitable tablet computers may include those with booklet, slate, and convertible configurations.

In some embodiments, the digital processing device comprises an operating system configured to perform executable instructions. The operating system is, for example, software, including programs and data, which manages the device's hardware and provides services for execution of applications. Those of skill in the art will recognize that suitable server operating systems may include, for example, FreeBSD, OpenBSD, NetBSD®, Linux, Apple® Mac OS X Server®, Oracle® Solaris®, Windows Server®, or Novell® NetWare®. Those of skill in the art will recognize that suitable personal computer operating systems may include, for example, Microsoft® Windows®, Apple® Mac OS X®, UNIX®, or UNIX-like operating systems such as GNU/Linux®. In some embodiments, the operating system is provided by cloud computing. Those of skill in the art will also recognize that suitable mobile smart phone operating systems may include, for example, Nokia® Symbian® OS, Apple® iOS®, Research In Motion® BlackBerry OS®, Google® Android®, Microsoft® Windows Phone® OS, Microsoft® Windows Mobile® OS, Linux®, or Palm® WebOS®. Those of skill in the art will also recognize that suitable media streaming device operating systems include, by way of non-limiting examples, Apple TV®, Roku®, Boxee®, Google TV®, Google Chromecast®, Amazon Fire®, and Samsung® HomeSync®. Those of skill in the art will also recognize that suitable video game console operating systems may include, for example, Sony® PS3®, Sony® PS4®, Microsoft® Xbox 360®, Microsoft Xbox One, Nintendo® Wii®, Nintendo® Wii U®, or Ouya®.

In some embodiments, the device comprises a storage and/or memory device. The storage and/or memory device may be one or more physical apparatuses used to store data or programs on a temporary or permanent basis. In some embodiments, the device is volatile memory and requires power to maintain stored information. In some embodiments, the device is non-volatile memory and retains stored information when the digital processing device is not powered. In further embodiments, the non-volatile memory comprises flash memory. In some embodiments, the non-volatile memory comprises dynamic random-access memory (DRAM). In some embodiments, the non-volatile memory comprises ferroelectric random access memory (FRAM). In some embodiments, the non-volatile memory comprises phase-change random access memory (PRAM). In other embodiments, the device comprises a storage device including, for example, CD-ROMs, DVDs, flash memory devices, magnetic disk drives, magnetic tapes drives, optical disk drives, or cloud computing-based storage. In further embodiments, the storage and/or memory device comprises a combination of devices such as those disclosed herein.

In some embodiments, the digital processing device comprises a display to send visual information to a user. In some embodiments, the display comprises a cathode ray tube (CRT). In some embodiments, the display comprises a liquid crystal display (LCD). In further embodiments, the display comprises a thin film transistor liquid crystal display (TFT-LCD). In some embodiments, the display comprises an organic light emitting diode (OLED) display. In various further embodiments, the OLED display comprises a passive-matrix OLED (PMOLED) or active-matrix OLED (AMOLED) display. In some embodiments, the display comprises a plasma display. In other embodiments, the display comprises a video projector. In still further embodiments, the display comprises a combination of devices such as those disclosed herein.

In some embodiments, the digital processing device comprises an input device to receive information from a user. In some embodiments, the input device comprises a keyboard. In some embodiments, the input device comprises a pointing device, for example, a mouse, trackball, track pad, joystick, game controller, or stylus. In some embodiments, the input device comprises a touch screen or a multi-touch screen. In other embodiments, the input device comprises a microphone to capture voice or other sound input. In other embodiments, the input device comprises a video camera or other sensor to capture motion or visual input. In further embodiments, the input device comprises a Kinect, a Leap Motion, or the like. In still further embodiments, the input device comprises a combination of devices such as those disclosed herein.

Non-Transitory Computer Readable Storage Medium

In some embodiments, the quantum-ready or quantum-enabled software development kit (SDK) disclosed herein comprises one or more non-transitory computer readable storage media encoded with a program comprising instructions executable by the operating system of an optionally networked digital processing device. In further embodiments, a computer readable storage medium is a tangible component of a digital processing device. In still further embodiments, a computer readable storage medium is optionally removable from a digital processing device. In some embodiments, a computer readable storage medium includes, for example, CD-ROMs, DVDs, flash memory devices, solid state memory, magnetic disk drives, magnetic tape drives, optical disk drives, cloud computing systems and services, or the like. In some cases, the program and instructions are permanently, substantially permanently, semi-permanently, or non-transitorily encoded on the media.

Computer Program

In some embodiments, the quantum-ready or quantum-enabled software development kit (SDK) disclosed herein comprises at least one computer program, or use of the same. A computer program comprises a sequence of instructions, executable in the digital processing device's CPU, written to perform a specified task. Computer readable instructions may be implemented as program modules, such as functions, objects, Application Programming Interfaces (APIs), data structures, and the like, that perform particular tasks or implement particular abstract data types. In light of the disclosure provided herein, those of skill in the art will recognize that a computer program may be written in various versions of various languages.

The functionality of the computer readable instructions may be combined or distributed as desired in various environments. In some embodiments, a computer program comprises one sequence of instructions. In some embodiments, a computer program comprises a plurality of sequences of instructions. In some embodiments, a computer program is provided from one location. In other embodiments, a computer program is provided from a plurality of locations. In various embodiments, a computer program comprises one or more software modules. In various embodiments, a computer program comprises, in part or in whole, one or more web applications, one or more mobile applications, one or more standalone applications, one or more web browser plug-ins, extensions, add-ins, or add-ons, or combinations thereof.

Web Application

In some embodiments, a computer program comprises a web application. In light of the disclosure provided herein, those of skill in the art will recognize that a web application, in various embodiments, utilizes one or more software frameworks and one or more database systems. In some embodiments, a web application is created upon a software framework such as Microsoft® .NET or Ruby on Rails (RoR). In some embodiments, a web application utilizes one or more database systems including, for example, relational, non-relational, object oriented, associative, or XML database systems. In further embodiments, suitable relational database systems include, for example, Microsoft® SQL Server, mySQL™, or Oracle®. Those of skill in the art will also recognize that a web application, in various embodiments, is written in one or more versions of one or more languages. A web application may be written in one or more markup languages, presentation definition languages, client-side scripting languages, server-side coding languages, database query languages, or combinations thereof. In some embodiments, a web application is written to at least some extent in a markup language, such as Hypertext Markup Language (HTML), Extensible Hypertext Markup Language (XHTML), or eXtensible Markup Language (XML). In some embodiments, a web application is written to at least some extent in a presentation definition language such as Cascading Style Sheets (CSS). In some embodiments, a web application is written to at least some extent in a client-side scripting language such as Asynchronous Javascript and XML (AJAX), Flash® Actionscript, Javascript, or Silverlight®. In some embodiments, a web application is written to at least some extent in a server-side coding language such as Active Server Pages (ASP), ColdFusion®, Perl, Java™ JavaServer Pages (JSP), Hypertext Preprocessor (PHP), Python™, Ruby, Tcl, Smalltalk, WebDNA®, or Groovy. In some embodiments, a web application is written to at least some extent in a database query language such as Structured Query Language (SQL). In some embodiments, a web application integrates enterprise server products such as IBM® Lotus Domino®. In some embodiments, a web application comprises a media player element. In various further embodiments, a media player element utilizes one or more of many suitable multimedia technologies including, for example, Adobe® Flash®, HTML 5, Apple® QuickTime®, Microsoft® Silverlight®, Java™, or Unity®.

Mobile Application

In some embodiments, a computer program comprises a mobile application provided to a mobile digital processing device. In some embodiments, the mobile application is provided to a mobile digital processing device at the time the mobile application is manufactured. In other embodiments, the mobile application is provided to a mobile digital processing device via the computer network described herein.

In view of the disclosure provided herein, a mobile application is created by techniques known to those of skill in the art using hardware, languages, and development environments known to the art. Those of skill in the art will recognize that mobile applications may be written in several languages. Suitable programming languages include, for example, C, C++, C#, Objective-C, Java™, Javascript, Pascal, Object Pascal, Python™, Ruby, VB.NET, WML, XHTML/HTML with or without CSS, or combinations thereof.

Suitable mobile application development environments may be available from several sources. Commercially available development environments include, for example, AirplaySDK, alcheMo, Appcelerator®, Celsius, Bedrock, Flash Lite, .NET Compact Framework, Rhomobile, or WorkLight Mobile Platform. Other development environments may be available without cost including, for example, Lazarus, MobiFlex, MoSync, or Phonegap. Also, mobile device manufacturers distribute software developer kits (SDKs) including, for example, iPhone and iPad (iOS) SDK, Android™ SDK, BlackBerry® SDK, BREW SDK, Palm® OS SDK, Symbian SDK, webOS SDK, or Windows® Mobile SDK.

Those of skill in the art will recognize that several commercial forums may be available for distribution of mobile applications including, for example, Apple® App Store, Android™ Market, BlackBerry® App World, App Store for Palm devices, App Catalog for webOS, Windows® Marketplace for Mobile, Ovi Store for Nokia® devices, Samsung® Apps, or Nintendo® DSi Shop.

Standalone Application

In some embodiments, a computer program comprises a standalone application, which is a program that is run as an independent computer process, and not as an add-on to an existing process (e.g., not a plug-in). Those of skill in the art will recognize that standalone applications may be compiled. A compiler generally refers to a computer program(s) that transforms source code written in a programming language into binary object code such as assembly language or machine code. Suitable compiled programming languages include, for example, C, C++, Objective-C, COBOL, Delphi, Eiffel, Java™, Lisp, Python™, Visual Basic, VB .NET, or combinations thereof. Compilation may be performed, at least in part, to create an executable program. In some embodiments, a computer program comprises one or more executable compiled applications.

Web Browser Plug-in

In some embodiments, the computer program comprises a web browser plug-in. In computing, a plug-in generally refers to one or more software components that add specific functionality to a larger software application. Makers of software applications may support plug-ins to enable third-party developers to create abilities which extend an application, to support easy addition of new features, or to reduce the size of an application. When supported, plug-ins may enable customization of the functionality of a software application. For example, plug-ins are commonly used in web browsers to play video, generate interactivity, scan for viruses, and display particular file types. Those of skill in the art will be familiar with several web browser plug-ins including, for example, Adobe® Flash® Player, Microsoft® Silverlight®, or Apple® QuickTime®. In some embodiments, the toolbar comprises one or more web browser extensions, add-ins, or add-ons. In some embodiments, the toolbar comprises one or more explorer bars, tool bands, or desk bands.

In view of the disclosure provided herein, those of skill in the art will recognize that several plug-in frameworks may be available that enable development of plug-ins in various programming languages, including, for example, C++, Delphi, Java™, PHP, Python™, VB .NET, or combinations thereof.

Web browsers (also called Internet browsers) generally refer to software applications, designed for use with network-connected digital processing devices, for retrieving, presenting, and traversing information resources on the World Wide Web. Suitable web browsers include, for example, Microsoft® Internet Explorer®, Mozilla® Firefox®, Google® Chrome, Apple® Safari®, Opera Software® Opera®, or KDE Konqueror. In some embodiments, the web browser comprises a mobile web browser. Mobile web browsers (also called micro-browsers, mini-browsers, or wireless browsers) may be designed for use on mobile digital processing devices including, for example, handheld computers, tablet computers, netbook computers, subnotebook computers, smartphones, music players, personal digital assistants (PDAs), or handheld video game systems. Suitable mobile web browsers include, for example, Google® Android® browser, RIM BlackBerry® Browser, Apple® Safari®, Palm® Blazer, Palm® WebOS® Browser, Mozilla® Firefox® for mobile, Microsoft® Internet Explorer® Mobile, Amazon® Kindle® Basic Web, Nokia® Browser, Opera Software® Opera® Mobile, or Sony® PSP™ browser.

Software Modules

In some embodiments, the quantum-ready or quantum-enabled software development kit (SDK) disclosed herein comprises software, server, and/or database modules, or use of the same. In view of the disclosure provided herein, software modules may be created by techniques known to those of skill in the art using machines, software, and/or languages known to the art. The software modules disclosed herein may be implemented in a multitude of ways. In various embodiments, a software module comprises a file, a section of code, a programming object, a programming structure, or combinations thereof. In further various embodiments, a software module comprises a plurality of files, a plurality of sections of code, a plurality of programming objects, a plurality of programming structures, or combinations thereof. In various embodiments, the one or more software modules comprise, for example, a web application, a mobile application, or a standalone application. In some embodiments, the one or more software modules are in one computer program or application. In other embodiments, the one or more software modules are in more than one computer program or application. In some embodiments, the one or more software modules are hosted on one machine. In other embodiments, the one or more software modules are hosted on more than one machine. In further embodiments, the one or more software modules are hosted on one or more cloud computing platforms. In some embodiments, the one or more software modules are hosted on one or more machines in one location. In other embodiments, the one or more software modules are hosted on one or more machines in more than one location.

Databases

In some embodiments, the quantum-ready or quantum-enabled software development kit (SDK) disclosed herein comprises one or more databases, or use of the same. In view of the disclosure provided herein, those of skill in the art will recognize that many databases are suitable for storage and retrieval of application information. In various embodiments, suitable databases include, for example, relational databases, non-relational databases, object-oriented databases, object databases, entity-relationship model databases, associative databases, or XML databases. In some embodiments, a database is internet-based. In further embodiments, a database is web-based. In still further embodiments, a database is cloud computing-based. In other embodiments, a database is based on one or more local computer storage devices.

Although the present disclosure has made reference to quantum computers, methods and systems of the present disclosure may be employed for use with other types of computers, which may be non-classical computers. Such non-classical computers may be quantum computers, hybrid quantum computers, quantum-type computers, or other computers that are not classical computers. Examples of non-classical computers include, but not limited to, Hitachi Ising solvers, coherent Ising machines based on optical parameters, and other solvers which utilize different physical phenomena to obtain more efficiency in solving particular classes of problems.

Methods and systems of the present disclosure may be used to process requests over a cloud network or other distributed environment. Examples of systems and methods that may be used to process requests over a cloud network or other distributed environment are provided in, for example, U.S. Pat. No. 9,537,953 and U.S. patent application Ser. No. 15/349,519, each of which is entirely incorporated herein by reference.

Methods and systems of the present disclosure may be employed for use with other methods and systems, such as those described in, for example, U.S. patent application Ser. No. 15/165,655, which is entirely incorporated herein by reference.

Computer Control Systems

Figure 7:
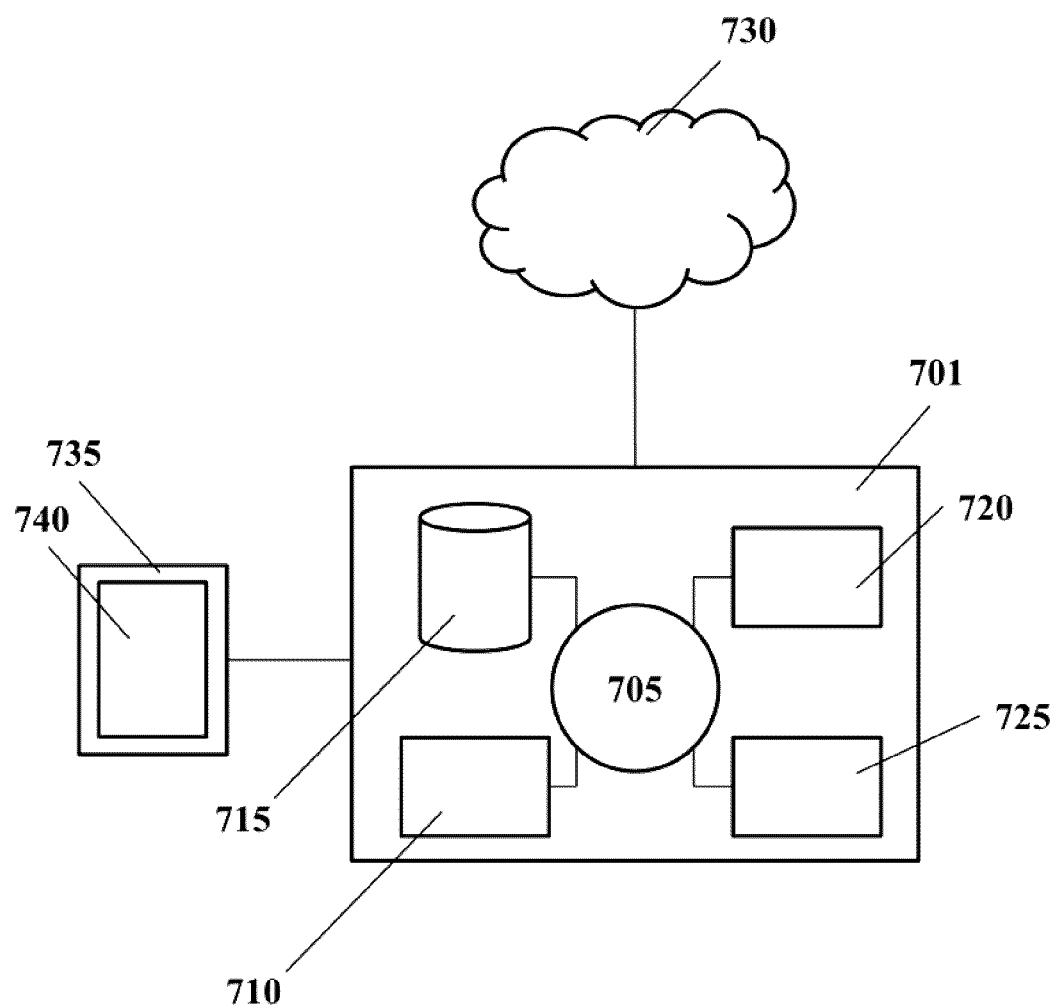
FIG. 7 shows a computer control system that is programmed or otherwise configured to implement methods provided herein.

The present disclosure provides computer control systems that are programmed to implement methods of the disclosure. FIG. 7 shows a computer system 701 that is programmed or otherwise configured to generating one or more instructions for execution by a common solver, wherein the one or more instructions are generated by a digital computer comprising at least one computer processor and a memory, the digital computer coupled to a quantum-ready or quantum-enabled computing system comprising the common solver, and wherein the common solver executes the one or more instructions to generate an output. The computer system 701 can regulate various aspects of the present disclosure, such as, for example, generating instructions for execution by a common solver. The computer system 701 can be an electronic device of a user or a computer system that is remotely located with respect to the electronic device. The electronic device can be a mobile electronic device. The computer system 701 can be a digital computer, in some cases a classical computer.

The computer system 701 includes a central processing unit (CPU, also "processor" and "computer processor" herein) 705, which can be a single core or multi core processor, or a plurality of processors for parallel processing. The computer system 701 also includes memory or memory location 710 (e.g., random-access memory, read-only memory, flash memory), electronic storage unit 715 (e.g., hard disk), communication interface 720 (e.g., network adapter) for communicating with one or more other systems, and peripheral devices 725, such as cache, other memory, data storage and/or electronic display adapters. The memory 710, storage unit 715, interface 720 and peripheral devices 725 are in communication with the CPU 705 through a communication bus (solid lines), such as a motherboard. The storage unit 715 can be a data storage unit (or data repository) for storing data. The computer system 701 can be operatively coupled to a computer network ("network") 730 with the aid of the communication interface 720. The network 730 can be the Internet, an internet and/or extranet, or an intranet and/or extranet that is in communication with the Internet. The network 730 in some cases is a telecommunication and/or data network. The network 730 can include one or more computer servers, which can enable distributed computing, such as cloud computing. The network 730, in some cases with the aid of the computer system 701, can implement a peer-to-peer network, which may enable devices coupled to the computer system 701 to behave as a client or a server.

The CPU 705 can execute a sequence of machine-readable instructions, which can be embodied in a program or software. The instructions may be stored in a memory location, such as the memory 710. The instructions can be directed to the CPU 705, which can subsequently program or otherwise configure the CPU 705 to implement methods of the present disclosure. Examples of operations performed by the CPU 705 can include fetch, decode, execute, and writeback.

The CPU 705 can be part of a circuit, such as an integrated circuit. One or more other components of the system 701 can be included in the circuit. In some cases, the circuit is an application specific integrated circuit (ASIC).

The storage unit 715 can store files, such as drivers, libraries and saved programs. The storage unit 715 can store user data, e.g., user preferences and user programs. The computer system 701 in some cases can include one or more additional data storage units that are external to the computer system 701, such as located on a remote server that is in communication with the computer system 701 through an intranet or the Internet.

The computer system 701 can communicate with one or more remote computer systems through the network 730. For instance, the computer system 701 can communicate with a remote computer system of a user (e.g., through a cloud network or other distributed network). Examples of remote computer systems include personal computers (e.g., portable PC), slate or tablet PC's (e.g., Apple® iPad, Samsung® Galaxy Tab), telephones, Smart phones (e.g., Apple® iPhone, Android-enabled device, Blackberry®), or personal digital assistants. The user can access the computer system 701 via the network 730.

The computer system 701 can communicate with a quantum-ready or quantum-enabled computing system through the network 730. Such communication may be as described in, for example, U.S. Pat. No. 9,537,953 and U.S. patent application Ser. No. 15/349,519, each of which is entirely incorporated herein by reference.

Methods as described herein can be implemented by way of machine (e.g., computer processor) executable code stored on an electronic storage location of the computer system 701, such as, for example, on the memory 710 or electronic storage unit 715. The machine executable or machine readable code can be provided in the form of software. During use, the code can be executed by the processor 705. In some cases, the code can be retrieved from the storage unit 715 and stored on the memory 710 for ready access by the processor 705. In some situations, the electronic storage unit 715 can be precluded, and machine-executable instructions are stored on memory 710.

The code can be pre-compiled and configured for use with a machine having a processor adapted to execute the code, or can be compiled during runtime. The code can be supplied in a programming language that can be selected to enable the code to execute in a pre-compiled or as-compiled fashion.

Aspects of the systems and methods provided herein, such as the computer system 701, can be embodied in programming. Various aspects of the technology may be thought of as "products" or "articles of manufacture" typically in the form of machine (or processor) executable code and/or associated data that is carried on or embodied in a type of machine readable medium. Machine-executable code can be stored on an electronic storage unit, such as memory (e.g., read-only memory, random-access memory, flash memory) or a hard disk. "Storage" type media can include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer into the computer platform of an application server. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium, such as computer-executable code, may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the databases, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a ROM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a processor for execution.

The computer system 701 can include or be in communication with an electronic display 735 that comprises a user interface (UI) 740 for providing, for example, means to accept user input from an application at an application interface. Examples of UI's include, without limitation, a graphical user interface (GUI) and web-based user interface.

Methods and systems of the present disclosure can be implemented by way of one or more algorithms. An algorithm can be implemented by way of software upon execution by the central processing unit 705. The algorithm can, for example, generate instructions for execution by a common solver.

While preferred embodiments of the present invention have been described herein, it will be obvious to those skilled in the art that such embodiments are provided by way of example only. It is not intended that the invention be limited by the specific examples provided within the specification. While the invention has been described with reference to the aforementioned specification, the descriptions and illustrations of the embodiments herein are not meant to be construed in a limiting sense. Numerous variations, changes, and substitutions will be apparent to those skilled in the art without departing from the invention. Furthermore, it shall be understood that all aspects of the invention are not limited to the specific depictions, configurations, or relative proportions set forth herein which depend upon a variety of conditions and variables. It should be understood that various alternatives to the embodiments of the invention described herein may be employed in practicing the invention. It is therefore contemplated that the invention shall also cover any such alternatives, modifications, variations, or equivalents. It is intended that the following claims define the scope of the invention and that methods and structures within the scope of these claims and their equivalents be covered thereby.

What is claimed is:

1. A method for generating one or more instructions for execution by a solver layer comprising a common interface, which solver layer is part of a quantum-ready or quantum-enabled computing system, wherein the one or more instructions are generated by a digital computer comprising at least one computer processor and memory, and wherein the solver layer executes the one or more instructions to generate an output, the method comprising:
   a. accepting user input from an application at an application interface, which application is executed on the digital computer, which user input corresponds to a problem to be solved by the quantum-ready or quantum-enabled computing system, which problem is not in polynomial unconstrained binary optimization (PUBO) form;
   b. selecting one or more algorithms from a plurality of algorithms at an algorithms layer, wherein each of the plurality of algorithms is configured to transform the problem into one or more instructions in PUBO form;
   c. executing the one or more algorithms to thereby transform the problem into one or more instructions in PUBO form;
   d. using one or more PUBO solvers to execute the one or more instructions in the PUBO form at the common interface of the solver layer of the quantum-ready or quantum-enabled computing system, to generate the output; and
   e. providing the output at the application interface.

2. The method of claim 1, wherein the quantum-ready or quantum-enabled computing system comprises a quantum annealer, an Ising solver, an optical parametric oscillator (OPO), a gate model of quantum computing, or another type of quantum computer.

3. The method of claim 1, wherein the PUBO form is a quadratic unconstrained binary optimization (QUBO) form.

4. The method of claim 1, wherein the one or more PUBO solvers of the common interface of the solver layer comprise one or more quadratic unconstrained binary optimization (QUBO) solvers.

5. The method of claim 1, wherein the one or more algorithms are transformed at the algorithms layer.

6. The method of claim 1, wherein the one or more algorithms are transformed using a binary polynomial layer.

7. The method of claim 1, wherein the one or more algorithms are transformed at a polynomial constrained integer optimization layer.

8. The method of claim 1, wherein the one or more algorithms are transformed at a polynomial constrained binary optimization layer.

9. The method of claim 1, wherein the one or more algorithms are transformed by the common interface of the solver layer.

10. The method of claim 1, wherein the algorithms layer comprises one or more of: max (maximum) k-quasi clique, chromatic number, graph similarity, coloring feasibility, max co-k-plex, minimum clique cover, k-clique cover feasibility, linear knapsack, and balanced partitioning.

11. The method of claim 1, wherein transforming the one or more algorithms comprises the use of one or more of: a transformation of the PUBO form to a quadratic unconstrained binary optimization (QUBO) form, binary polynomial operations, and efficient search in binary space.

12. The method of claim 1, wherein the one or more algorithms are implemented using a classical optimization system or a quantum oracle.

13. A system for generating one or more instructions for execution by a solver layer comprising a common interface, comprising:
 a. a quantum-ready or quantum-enabled computing system comprising the solver layer;
 b. a digital computer comprising at least one computer processor;
 c. a computer memory storing computer processor executable instructions which, when executed by the at least one computer processor, implement a method comprising:
  i. accepting user input from an application at an application interface, which application is executed on the digital computer, which user input corresponds to a problem to be solved by the quantum-ready or quantum-enabled computing system, which problem is not in polynomial unconstrained binary optimization (PUBO) form;
  ii. selecting one or more algorithms from a plurality of algorithms at an algorithms layer, wherein each of the plurality of algorithms is configured to transform the problem into one or more instructions in PUBO form;
  iii. executing the one or more algorithms to thereby transform the problem into one or more instructions in PUBO form;
  iv. using one or more PUBO solvers to execute the one or more instructions in the PUBO form at the common interface of the solver layer of the quantum-ready or quantum enabled computing system, to generate the output; and
  v. providing the output at the application interface.

14. The system of claim 13, wherein the quantum-ready or quantum-enabled computing system comprises a quantum annealer, an Ising solver, an optical parametric oscillator (OPO), a gate model of quantum computing, or another type of quantum computer.

15. The system of claim 13, wherein the PUBO form is a quadratic unconstrained binary optimization (QUBO) form.

16. The system of claim 13, wherein the algorithms layer comprises one or more of: max (maximum) k-quasi clique, chromatic number, graph similarity, coloring feasibility, max co-k-plex, minimum clique cover, k-clique cover feasibility, linear knapsack, and balanced partitioning.

17. The system of claim 13, wherein transforming the one or more algorithms comprises the use of one or more of: a transformation of the PUBO form to a quadratic unconstrained binary optimization (QUBO) form, binary polynomial operations, and efficient search in binary space.

18. The system of claim 13, wherein the one or more algorithms are implemented using a classical optimization system or a quantum oracle.

19. A method for generating one or more instructions for execution by a solver layer comprising a common interface, which solver layer is part of a quantum-ready or quantum-enabled computing system, wherein the one or more instructions are generated by a digital computer comprising at least one computer processor and memory, and wherein the solver layer executes the one or more instructions to generate an output, the method comprising:
 a. accepting user input from an application at an application interface, which application is executed on the digital computer, which user input corresponds to a problem to be solved by the quantum-ready or quantum-enabled computing system;
 b. selecting one or more algorithms from a plurality of algorithms at an algorithms layer, wherein each of the plurality of algorithms is configured to transform the problem into one or more instructions in polynomial unconstrained binary optimization (PUBO) form;
 c. executing the one or more algorithms to thereby transform the problem into the one or more instructions in PUBO form;
 d. selecting one or more PUBO solvers from a plurality of PUBO solvers at the common interface;
 e. using the one or more PUBO solvers to execute the one or more instructions in the PUBO form at the common interface of the solver layer of the quantum-ready or quantum-enabled computing system to generate the output; and
 f. providing the output at the application interface.

20. The method of claim 19, wherein the quantum-ready or quantum-enabled computing system comprises a quantum annealer, an Ising solver, an optical parametric oscillator (OPO), a gate model of quantum computing, or another type of quantum computer.

21. The method of claim 19, wherein the algorithms layer comprises one or more of: max (maximum) k-quasi clique, chromatic number, graph similarity, coloring feasibility, max co-k-plex, minimum clique cover, k-clique cover feasibility, linear knapsack, and balanced partitioning.

22. The method of claim 19, wherein transforming the one or more algorithms comprises the use of one or more of: a transformation of the PUBO form to a quadratic unconstrained binary optimization (QUBO) form, binary polynomial operations, and efficient search in binary space.

* * * * *